US012688191B2

(12) United States Patent
Quamar et al.

(10) Patent No.: US 12,688,191 B2
(45) Date of Patent: Jul. 21, 2026

(54) ONTOLOGY-BASED QUERY ROUTING FOR DISTRIBUTED KNOWLEDGE BASES

(71) Applicant: International Business Machines Corporation, Armonk, NY (US)

(72) Inventors: Abdul Quamar, San Jose, CA (US); Fatma Ozcan, San Jose, CA (US); Rana Alotaibi, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 807 days.

(21) Appl. No.: 16/594,460

(22) Filed: Oct. 7, 2019

(65) Prior Publication Data

US 2021/0103586 A1      Apr. 8, 2021

(51) Int. Cl.
| | |
|---|---|
| *G06F 16/2453* | (2019.01) |
| *G06F 16/2455* | (2019.01) |
| *G06F 16/25* | (2019.01) |
| *G06F 16/36* | (2019.01) |
| *G06N 5/02* | (2023.01) |

(52) U.S. Cl.
CPC .... *G06F 16/24535* (2019.01); *G06F 16/2456* (2019.01); *G06F 16/258* (2019.01); *G06F 16/367* (2019.01); *G06N 5/02* (2013.01)

(58) Field of Classification Search
CPC ............. G06F 16/24535; G06F 16/367; G06F 16/2456; G06F 16/258; G06N 5/02
USPC ........................................................ 707/769
See application file for complete search history.

(56) References Cited

U.S. PATENT DOCUMENTS

| | | | |
|---|---|---|---|
| 7,200,563 | B1 | 4/2007 | Hammitt et al. |
| 9,189,479 | B2 | 11/2015 | Spivack et al. |
| 9,501,565 | B1 | 11/2016 | Ajmera et al. |
| 9,547,640 | B2 | 1/2017 | Bostick et al. |

(Continued)

FOREIGN PATENT DOCUMENTS

| | | |
|---|---|---|
| CN | 101512504 A | 8/2009 |
| CN | 101593180 A | 12/2009 |

(Continued)

OTHER PUBLICATIONS

PCTNotification of Transmittal of the International Search Report and the Written Opinion of the International Searching Authority, or the Declaration for Application No. PCT/IB2020/05941 dated Jan. 15, 2021.

(Continued)

*Primary Examiner* — Giovanna B Colan
(74) *Attorney, Agent, or Firm* — Caleb Wilkes, Esq.; Heslin Rothenberg Farley & Mesiti P.C.; George S. Blasiak, Esq.

(57) ABSTRACT

Techniques for query routing are provided. An ontological query is received by a query orchestrator. One or more query blocks, each indicating one or more operations and one or more quantifiers representing data flow between query blocks, are generated based on the ontological query. At least one data node is identified for each of the one or more query blocks, based on the one or more quantifiers and the one or more operations. One or more of the identified data nodes are selected based on predefined cost criteria, and one or more subqueries are transmitted to the selected one or more data nodes.

20 Claims, 19 Drawing Sheets

(56) References Cited

U.S. PATENT DOCUMENTS

| | | | |
|---|---|---|---|
| 9,875,289 | B2 | 1/2018 | Spratt |
| 10,311,442 | B1 | 6/2019 | Lancaster |
| 2005/0091241 | A1 | 4/2005 | Mills et al. |
| 2006/0218123 | A1 | 9/2006 | Chowdhuri et al. |
| 2007/0038609 | A1 | 2/2007 | Wu |
| 2007/0050347 | A1 | 3/2007 | Johannes Maria Meijer et al. |
| 2008/0077598 | A1* | 3/2008 | Wilmering ............ G06F 16/367 |
| 2008/0177767 | A1* | 7/2008 | Lin ......................... H04L 45/64 |
| | | | 709/251 |
| 2008/0307523 | A1* | 12/2008 | Subramanyam ........ G06F 16/36 |
| | | | 726/21 |
| 2011/0087625 | A1 | 4/2011 | Tanner et al. |
| 2012/0036249 | A1 | 2/2012 | Chandrasekaran |
| 2012/0303356 | A1 | 11/2012 | Boyle et al. |
| 2013/0066921 | A1 | 3/2013 | Mark et al. |
| 2013/0091119 | A1 | 4/2013 | Huang et al. |
| 2013/0198117 | A1 | 8/2013 | Upadhyaya et al. |
| 2014/0114910 | A1 | 4/2014 | Cao et al. |
| 2015/0039579 | A1 | 2/2015 | Clark et al. |
| 2015/0278198 | A1* | 10/2015 | Andreev ............... G06F 40/268 |
| | | | 704/9 |
| 2015/0347480 | A1 | 12/2015 | Smart |
| 2016/0224569 | A1 | 8/2016 | Cuddihy et al. |
| 2016/0321377 | A1 | 11/2016 | Noble |
| 2017/0075953 | A1 | 3/2017 | Bozkaya et al. |
| 2017/0308521 | A1 | 10/2017 | Bruno et al. |
| 2018/0012145 | A1 | 1/2018 | Maurya et al. |
| 2018/0189389 | A1 | 7/2018 | Baldini Soares et al. |
| 2018/0246929 | A1 | 8/2018 | Kreutzer et al. |
| 2018/0253653 | A1 | 9/2018 | Ozcan et al. |
| 2018/0276261 | A1* | 9/2018 | Smart ...................... G06F 16/26 |
| 2018/0285415 | A1 | 10/2018 | Beavin et al. |
| 2019/0005395 | A1 | 1/2019 | Dutkowski |
| 2019/0057145 | A1 | 2/2019 | Huang et al. |
| 2019/0197160 | A1* | 6/2019 | Maduko ............ G06F 16/24544 |
| 2019/0251157 | A1 | 8/2019 | Canton et al. |
| 2019/0384844 | A1* | 12/2019 | Ding ................. G06F 16/24539 |
| 2020/0057809 | A1* | 2/2020 | Xu ........................... G06F 18/23 |
| 2021/0208987 | A1 | 7/2021 | Hao et al. |

FOREIGN PATENT DOCUMENTS

| | | | | |
|---|---|---|---|---|
| CN | 102542027 | A | 7/2012 | |
| CN | 102915304 | A | 2/2013 | |
| CN | 104778277 | A | 7/2015 | |
| CN | 105893483 | A | 4/2016 | |
| CN | 106294757 | A | 1/2017 | |
| CN | 107016011 | A | 8/2017 | |
| CN | 107886107 | A | 4/2018 | |
| CN | 108984308 | A | 12/2018 | |
| CN | 110069668 | A | 7/2019 | |
| CN | 110297911 | A | 10/2019 | |
| CN | 107491561 | B | 5/2020 | |
| CN | 114586012 | A | 6/2022 | |
| CN | 114586028 | A | 6/2022 | |
| DE | 112020004814 | T5 | 6/2022 | |
| DE | 112020004815 | T5 | 6/2022 | |
| GB | 2604769 | A | 9/2022 | |
| GB | 2604770 | A | 9/2022 | |
| JP | 2013-033452 | A | 2/2013 | |
| JP | 2022-551253 | A | 12/2022 | |
| JP | 2022-551255 | A | 12/2022 | |
| WO | 2005008358 | * | 1/2005 | ............ G06F 17/30 |
| WO | 2005008358 | A2 | 1/2005 | |
| WO | 2015/019364 | A2 | 2/2015 | |
| WO | 2017/100356 | A1 | 6/2017 | |
| WO | 2021/070012 | A1 | 4/2021 | |
| WO | 2021/070013 | A1 | 4/2021 | |

OTHER PUBLICATIONS

PCT Notification of the International Search Report and the Written Opinion of the International Searching Autority, or the Declaration for Application Number PCT/IB2020/059140 dated Dec. 30, 2020.

Jens Lehmann, Robert Isele, Max Jakob, et al. Dbpedia—A large-scale, multilingual knowledge base extracted from wikipedia. Semantic Web, 2015. 29 pages.

Kurt Bollacker, Colin Evans, Praveen Paritosh, Tim Sturge, and Jamie Taylor. Freebase: a collaboratively created graph database for structuring human knowledge. In ACM SIGMOD, 2008, 3 pages.

Fabian M. Suchanek, Gjergji Kasneci, and Gerhard Weikum. Yago: A large ontology from wikipedia and wordnet. Semantic Web, 2008, 21 pages.

Amit P. Sheth and James A. Larson. Federated database systems for managing distributed, heterogeneous, and autonomous databases. ACM Comput. Surv., 22(3):183-236, Sep. 1990.

Gio Wiederhold. Mediators in the architecture of future information systems. IEEE Computer, 1992, 38 pages.

J. Duggan, A. J. Elmore, M. Stonebraker, M. Balazinska, B. Howe, J. Kepner, S. Madden, D. Maier, T. Mattson, and S. B. Zdonik. The BigDAWG polystore system. SIGMOD Record, 2015, 4 pages.

Owl 2 web ontology language document overview.https://www.w3.org/TR/owl2-overview/. Accessed: Jun. 1, 2018.

Diptikalyan Saha, Avrilia Floratou, Karthik Sankaranarayanan, et al.Athena: An ontology-driven system for natural language querying over relational data stores. PVLDB, 9(12):1209-1220, 2016.

Shreyas Bharadwaj, Laura Chiticariu, Marina Danilevsky, et al. Creation and interaction with large-scale domain-specific knowledge bases. PVLDB, 2017, 4 pages.

Serge Abiteboul, Richard Hull, and Victor Vianu. Foundations of databases: the logical level. Addison-Wesley Longman Publishing Co., Inc., 1995.

Alon Levy, Anand Rajaraman, and Joann Ordille. Querying heterogeneous information sources using source descriptions. Technical report, Stanford InfoLab, 1996, 12 pages.

Sudarshan Chawathe, Hector Garcia-Molina, Joachim Hammer, Kelly Ireland, Yannis Papakonstantinou, Jeffrey Ullman, and Jennifer Widom. The TSIMMIS project: Integration of heterogeneous information sources. 1994, 12 pages.

Hamid Pirahesh, Joseph M. Hellerstein, and Waqar Hasan. Extensible/rule based query rewrite optimization in starburst. In ACM SIGMOD, pp. 39-48, 1992.

Petr Slavlk. A tight analysis of the greedy algorithm for set cover., Journal of Algorithms, vol. 25, Nov. 1997, pp. 237-254 (Abstract Only).

Chokri Ben Necib and Johann-Christoph Freytag. Ontology Based Query Processing in Database Management Systems, pp. 839-857. 2003.

J. Bhogal, A. Macfarlane, and P. Smith. A review of ontology based query expansion. Inf. Process. Manage, Informatoin Processing & Management, vol. 43, Issue 4, Jul. 2007, pp. 866-886 (Abstract Only).

Nigel Collier, Reiko Matsuda Goodwin, John McCrae, et al. An ontology-driven system for detecting global health events. In COLING, pp. 215-222, 2010.

Diego Calvanese, Giuseppe De Giacomo, Domenico Lembo, et al. The mastro system for ontology-based data access. Semant. web, pp. 43-53, 2011.

Evgeny Kharlamov, Theofilos P. Mailis, Konstantina Bereta, et al. A semantic approach to polystores. In IEEE Big Data, 2016, 10 pages.

Justin McHugh, Paul E. Cuddihy, Jenny Weisenberg Williams, et al. Integrated access to big data polystores through a knowledge-driven framework. In IEEE Big Data, 2017 (Abstract Only).

Laura Haas, Donald Kossmann, Edward Wimmers, and Jun Yang. Optimizing queries across diverse data sources. 1997, 10 pages.

Donald Kossmann. The state of the art in distributed query processing. ACM Comput. Surv., 32(4):422-469, Dec. 2000.

Joana Manolescu, Daniela Florescu, and Donald Kossmann. Answering XML queries on heterogeneous data sources. In VLDB, vol. 1, pp. 241-250, 2001.

F. Bugiotti, D. Bursztyn, A. Deutsch, Ileana. I, and Manolescu. I. Invisible glue: Scalable Self-Tuning Multi-Stores. In CIDR, 2015, 8 pages.

Jeff LeFevre, Jagan Sankaranarayanan, Hakan Hacigumus, et al. Miso:souping up big data query processing with a multistore system. In ACM SIGMOD, pp. 1591-1602, 2014.

(56)          References Cited

OTHER PUBLICATIONS

Ionel Gog, Malte Schwarzkopf, Natacha Crooks, et al. Musketeer: all for one, one for all in data processing systems. In Proceedings of the Tenth European Conference on Computer Systems, p. 2. ACM, 2015, 16 pages.

Boyan Kolev, Carlyna Bondiombouy, Patrick Valduriez, et al. The cloudmdsql multistore system. In Proceedings of the 2016 International Conference on Management of Data, pp. 2113-2116. ACM, 2016.

U.S. Appl. No. 16/594,391 "Ontology-Based Query Routing for Domain Specific Knowledge Bases," filed Oct. 7, 2019.

IBM, "List of IBM Patents or Patent Applications Treated As Related," for U.S. Appl. No. 16/594,460, filed Oct. 7, 2019.

Dario Bonino, Fulvio Corno, Laura Farinetti, Alessio Bosca, "Ontology Driven Semantic Search," 2017, 9 Pages.

Nilsson, Hjelm and Oxhammar, "SUIS—Cross-Language Ontology-Driven Information Retrieval in a Restricted Domain,"Proceedings of the 15th Nodalida Conference, 2005, pp. 139-145.

Jeffrey Dalton, Laura Dietz and James Allen, "Entity Query Feature Expansion Using Knowledge Base Links," Center for Intelligent Information Retrieval, 2014, 10 Pages.

Olena Parkhomenko, Yugyung Lee and E.K. Park, "Ontology-Driven Peer Profiling in Peer-To-Peer Enabled Semantic Web," Univeristy of Missouri—Kansas City, 2003, 4 Pages.

Disclosed Anonymously,"Contextual Inference in Underspecified Queries Using Ontology-Driven," IPCOM000227426D, May 7, 2013, 3 Pages.

Disclosed Anonymously,"Continuous Improved Conversation Entities," IPCOM000254529D, Jul. 10, 2018, 4 Pages.

Disclosed Anonymously, "Adapting Conversation Based on Perceived User Expertise," IPCOM000258019D, Apr. 1, 2019, 5 Pages.

Examination Report Under Section 18(3) for United Kingdom Patent Application No. GB2206537.9, dated Dec. 14, 2022.

Intellectual Property Office, Examination Report under Section 18(3) for Application GB2206536.1 dated Mar. 1, 2023.

UK Intellectual Property Office, Reply to Examination Report dated Mar. 1, 2023 for Application 2206536.1 dated Apr. 3, 2023.

UK Intellectual Property Office, Examination Report for Application GB2206536.1 dated May 19, 2023.

UK Intellectual Property Office, Examination Report for Application GB2206537.9 dated Jun. 6, 2023.

The State Intellectual Property Office of People's Republic of China, "Second Office action", Jan. 22, 2025, 05 Pages, CN Application No. 202080070094.3.

Yadong et al., "Research and Implementation of Science and Technology Information Knowledge Base Management System Based on Ontology Model", Computer Science and Technology, May 21, 2018, 98 Pages.

The State Intellectual Property Office of People's Republic of China, "First Office action", Oct. 12, 2024, 22 Pages, CN Application No. 202080070100.5.

The State Intellectual Property Office of People's Republic of China, "First Office action", Oct. 29, 2024, 13 Pages, CN Application No. 202080070094.3.

* cited by examiner

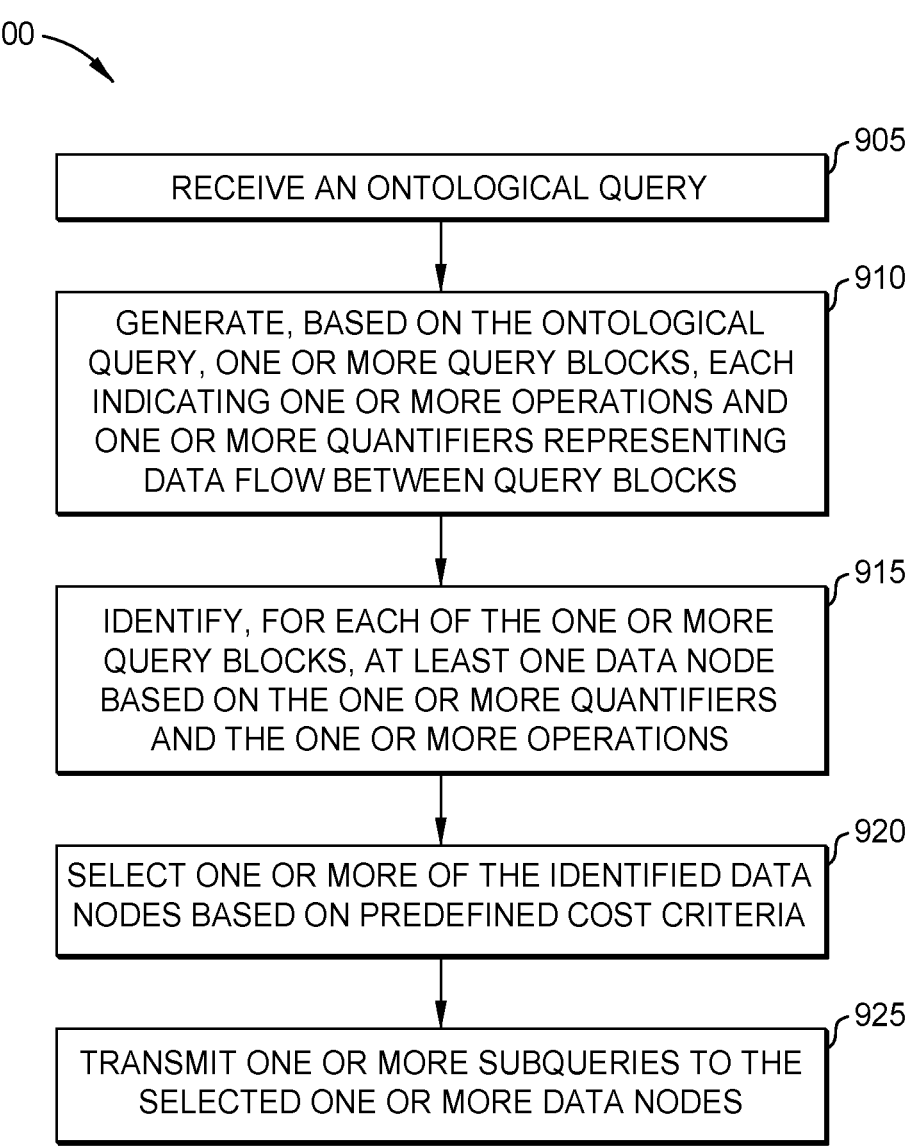

900

905
RECEIVE AN ONTOLOGICAL QUERY

910
GENERATE, BASED ON THE ONTOLOGICAL QUERY, ONE OR MORE QUERY BLOCKS, EACH INDICATING ONE OR MORE OPERATIONS AND ONE OR MORE QUANTIFIERS REPRESENTING DATA FLOW BETWEEN QUERY BLOCKS

915
IDENTIFY, FOR EACH OF THE ONE OR MORE QUERY BLOCKS, AT LEAST ONE DATA NODE BASED ON THE ONE OR MORE QUANTIFIERS AND THE ONE OR MORE OPERATIONS

920
SELECT ONE OR MORE OF THE IDENTIFIED DATA NODES BASED ON PREDEFINED COST CRITERIA

925
TRANSMIT ONE OR MORE SUBQUERIES TO THE SELECTED ONE OR MORE DATA NODES

FIG. 9

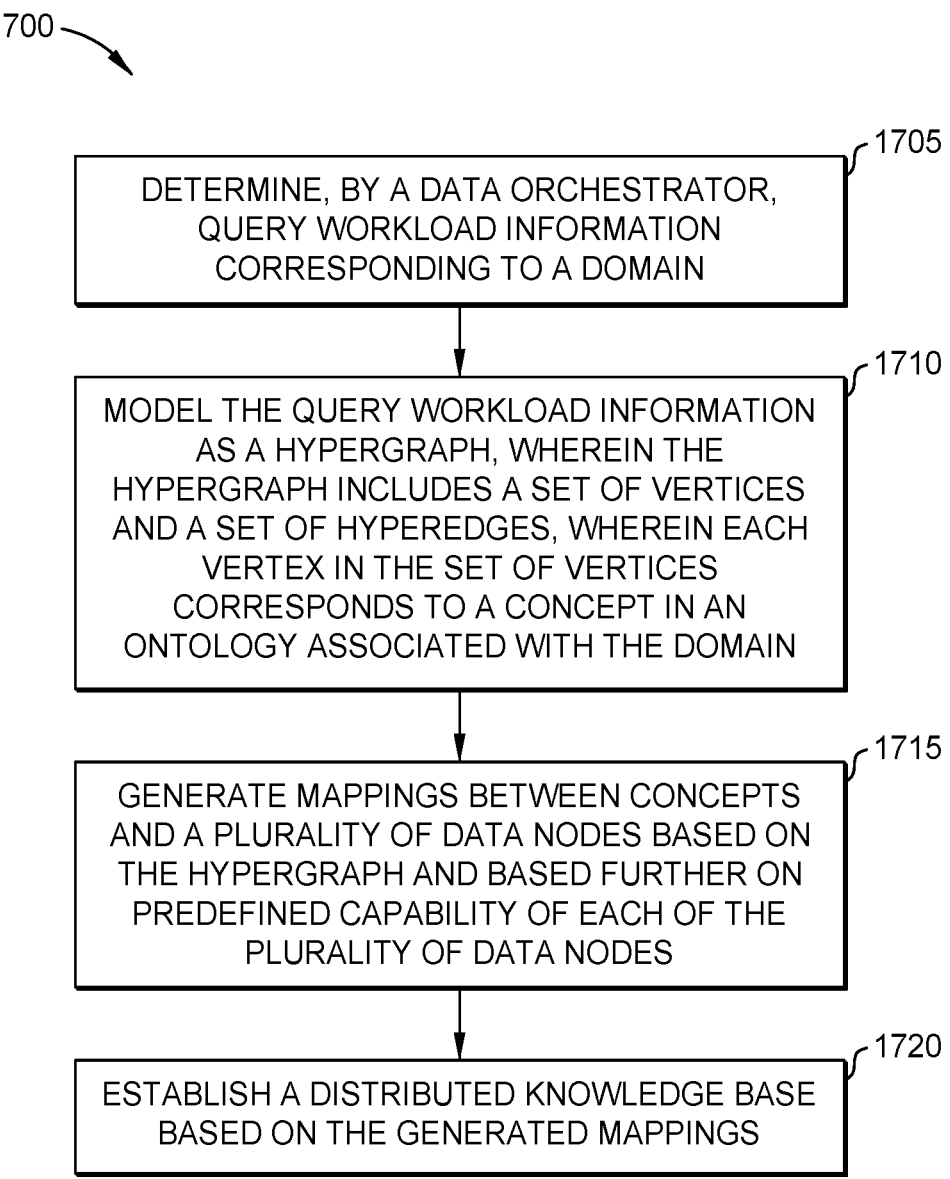

1700

1705

DETERMINE, BY A DATA ORCHESTRATOR, QUERY WORKLOAD INFORMATION CORRESPONDING TO A DOMAIN

1710

MODEL THE QUERY WORKLOAD INFORMATION AS A HYPERGRAPH, WHEREIN THE HYPERGRAPH INCLUDES A SET OF VERTICES AND A SET OF HYPEREDGES, WHEREIN EACH VERTEX IN THE SET OF VERTICES CORRESPONDS TO A CONCEPT IN AN ONTOLOGY ASSOCIATED WITH THE DOMAIN

1715

GENERATE MAPPINGS BETWEEN CONCEPTS AND A PLURALITY OF DATA NODES BASED ON THE HYPERGRAPH AND BASED FURTHER ON PREDEFINED CAPABILITY OF EACH OF THE PLURALITY OF DATA NODES

1720

ESTABLISH A DISTRIBUTED KNOWLEDGE BASE BASED ON THE GENERATED MAPPINGS

FIG. 17

ONTOLOGY-BASED QUERY ROUTING FOR DISTRIBUTED KNOWLEDGE BASES

BACKGROUND

The present disclosure relates to knowledge bases, and more specifically, to using ontologies for effective query routing in distributed knowledge bases.

A growing number of enterprises are utilizing Knowledge Bases (KBs) to augment their analytics and improve decision-making, efficiency, and effectiveness of their systems. Often, the KBs are relatively specialized within the domain of the enterprise. For example, financial institutions rely on KBs with significant financial knowledge, such as data related to governmental regulations of financial markets. Conversely, healthcare enterprises may maintain KBs with a considerable amount of data collected from medical literature. There is substantial need for deep domain specialization, effective systems, and effective techniques to manage these KBs. Existing systems, which are not aware of the domain ontology that provides an entity-centric view of the domain schema, are unable to effectively manage and route queries for the KB.

Additionally, KBs may be distributed across a number of data sites with varying capabilities and costs, in order to improve operations. Existing architectures, such as federated databases, rely on a centralized mediator to aggregate data from each such source. This is inefficient and scales poorly. Additionally, existing systems do not understand the underlying ontology and capabilities of each data source, and thus cannot efficiently route queries. This reduces the efficiency of such systems, requiring significant computing resources to respond to typical queries.

SUMMARY

According to one embodiment of the present disclosure, a method is provided. The method includes receiving, by a query orchestrator, an ontological query, and generating, based on the ontological query, one or more query blocks, each indicating one or more operations and one or more quantifiers representing data flow between query blocks. The method further includes identifying, for each of the one or more query blocks, at least one data node based on the one or more quantifiers and the one or more operations. Additionally, the method includes selecting one or more of the data nodes based on predefined cost criteria, and transmitting one or more subqueries to the selected one or more data nodes. Advantageously, the method enables the query orchestrator to efficiently route queries in a distributed environment based on the operations and quantifiers required by each block of the query. This reduces computational expense and improves system responsiveness.

According to another embodiment of the present disclosure, identifying, for a first query block of the one or more query blocks, at least one data node further comprises identifying, based on predefined capability criteria, a first set of data nodes configured to perform the one or more operations indicated by the first query block, and identifying, based on predefined concept mappings, a second set of data nodes configured to store the one or more quantifiers indicated by the first query block. In such an embodiment, the query orchestrator improves over existing systems by considering the capabilities of the underlying data nodes, as well as the stored locations of the concepts in the ontology. This again improves efficiency and reduces computational waste.

According to still another embodiment of the present disclosure, the method additionally includes, upon determining that a first data node belongs to both the first set and the second set of data nodes, associating the first query block with an annotation indicating the first data node. Advantageously, this enables the query orchestrator to intelligently route query blocks to data nodes by identifying nodes that are capable of both providing the necessary quantifiers and performing the necessary operations, which reduces or eliminates the transfer of data between nodes when completing the query. This thereby reduces computational expense of executing the query.

According to yet another embodiment of the present disclosure, the method further includes, upon determining that no data nodes belong to both the first set and the second set of data nodes, (i) identifying a first data node that belongs to the first set of data nodes, (ii) associating the first query block with an annotation indicating the first data node, and (iii) generating one or more additional query blocks to satisfy the one or more quantifiers of the first query block. Advantageously, such an embodiment enables the query orchestrator to efficiently split query blocks to allow them to be executed within individual data nodes. This allows appropriate nodes to be identified immediately, and reduces transfer costs and improves latency of executing the query.

According to another embodiment of the present disclosure, the method additionally includes, upon determining that the one or more operations indicated by the first query block include a join operation between two or more quantifiers, identifying a first data node that belongs to the first set of data nodes, and upon determining that the first data node is configured to store at least one of the two or more quantifiers, associating the first query block with an annotation indicating the first data node. This embodiment provides an advantage by enabling the query orchestrator to minimize data transfer costs by intelligently selecting nodes based on the data they store, using predefined mappings.

According to still another embodiment of the present disclosure, the method further includes associating the first query block with an annotation indicating the first data node based upon further determining that the first data node is a relational data node, wherein a second data node that is also configured to store at least one of the two or more quantifiers is excluded from the annotation based on determining that the second data node is not a relational data node. Advantageously, such an embodiment enables the query orchestrator to utilize the relative strengths of each data node when determining an efficient routing plan. For example, because relational data stores typically perform join operations more efficiently than other types of backend store, the query orchestrator can select a relational store for join operations whenever possible.

According to a further embodiment of the present disclosure, the method also includes selecting one or more of the data nodes based on predefined cost criteria by identifying each possible combination of data nodes across each of the one or more query blocks, generating, for each respective possible combination of data nodes, a respective movement descriptor defining a cost of transferring data between the respective combination of data nodes, and selecting a first combination of data nodes based on determining that the movement descriptor of the first combination of data nodes is lower than the movement descriptors of all other possible combinations of data nodes. One advantage of this embodiment is that the computing efficiency of each potential routing plan can be evaluated prior to selection of a plan. This improves efficiency and reduces costs and latency of the query execution.

According to yet another embodiment of the present disclosure, the method further includes, for each respective query block of the one or more query blocks, identifying a respective query fragment, from the ontological query, that corresponds to the respective query block, determining a type of a data node assigned to the respective query block, selecting a respective query translator based on the determined type of the data node assigned to the respective query block, and generating a respective subquery by processing the respective query fragment using the respective query translator. Advantageously, this enables the query orchestrator to translate subsections of the query based on the target data node, using predefined mappings. This improves the scalability of the system and reduces response time for each selected backend.

According to a different embodiment of the present disclosure, any of the above-discussed embodiments can be implemented by a computer-readable storage medium. The computer-readable storage medium contains computer program code that, when executed by operation of one or more computer processors, performs an operation. In embodiments, the operation performed can correspond to any combination of the above methods and embodiments.

According to yet another different embodiment of the present disclosure, any of the above-discussed embodiments can be implemented by a system. The system includes one or more computer processors, and a memory containing a program which, when executed by the one or more computer processors, performs an operation. In embodiments, the operation performed can correspond to any combination of the above methods and embodiments.

BRIEF DESCRIPTION OF THE SEVERAL
VIEWS OF THE DRAWINGS

FIG. 9 is a flow diagram illustrating a method for routing an ontological query, according to one embodiment disclosed herein.

FIG. 17 is a flow diagram illustrating a method for mapping ontological concepts to storage nodes, according to one embodiment disclosed herein.

DETAILED DESCRIPTION

Figure 1:
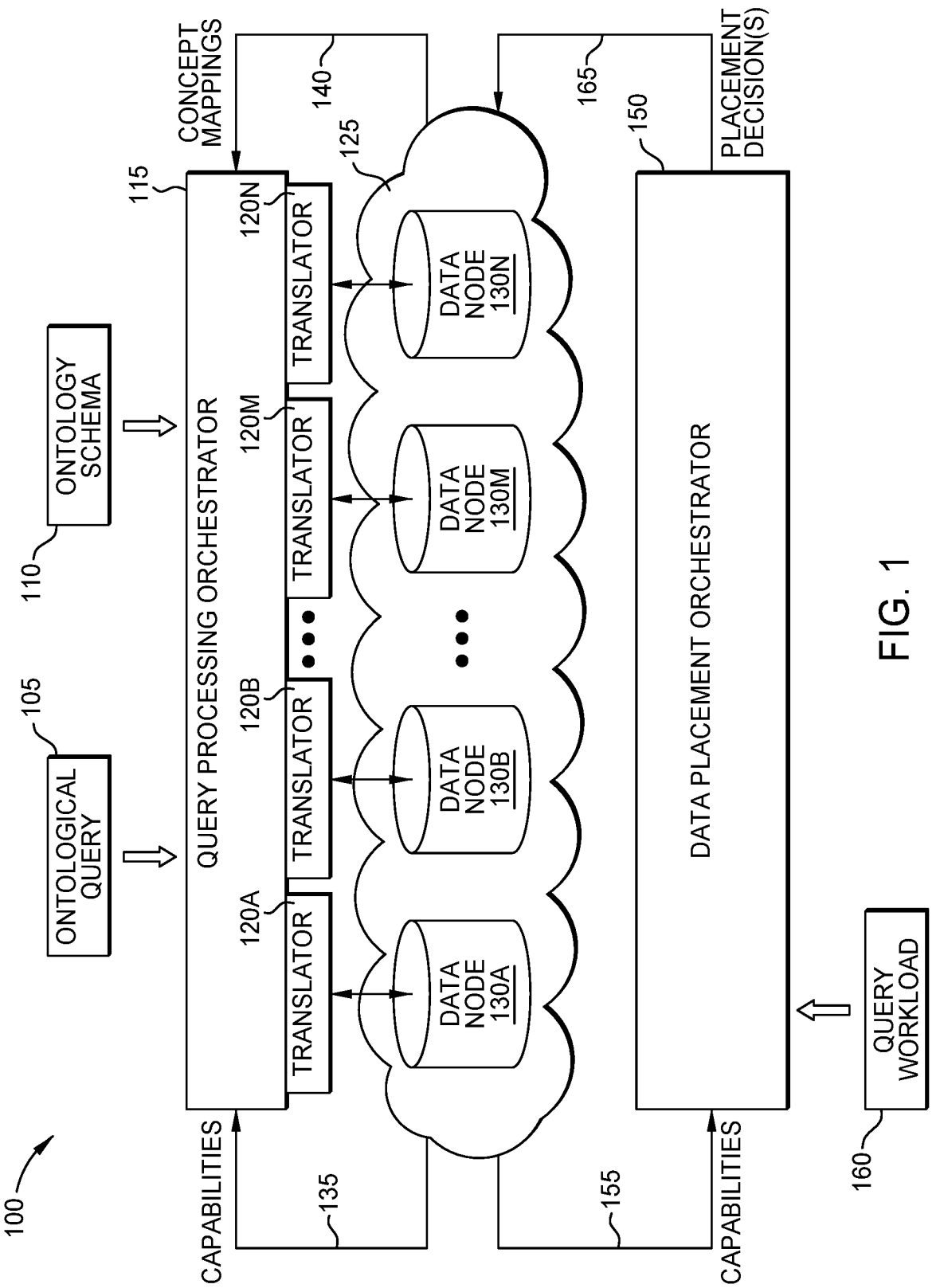
FIG. 1 illustrates an architecture configured to place data for a knowledge base and route ontological queries, according to one embodiment disclosed herein.

Embodiments of the present disclosure provide an ontology-driven architecture that provides support for a variety of query types using multiple data stores or nodes, each of which may have differing capabilities. Advantageously, embodiments of the present disclosure enable queries to be processed and routed efficiently to the diverse data stores based on an existing ontology, which improves the latency of the system and reduces computing resources required to identify and return relevant data. In embodiments, the techniques described herein can be used to support a variety of querying applications, including natural language and conversational interfaces. The systems described herein can provide transparent access to the underlying backend stores via an abstract ontology query language (OQL) that allows users to express their information needs against the domain ontology.

In one embodiment, to provide improved performance for different query types, the system first optimizes the placement of the KB data into different stores by placing subsets of the data in appropriate backend stores according to their capabilities. In some embodiments, at runtime, the system parses and compiles the OQL query, and translates it into the query languages and/or APIs of the different backend data nodes. In one embodiment, the system described herein also employs a query orchestrator that routes the query to a single or multiple backend stores, according to the placement of the relevant data. This efficient routing reduces the latency required to generate and return results to the requesting entity.

In embodiments, the KB data to be queried can include any information, including structured, unstructured, and/or semi-structured data. To support deep domain specialization, embodiments disclosed herein leverage domain ontologies. Notably, in one embodiment, the domain ontology only defines the entities and their relationships at the meta-data level, without providing instance level information. That is, in one embodiment, the domain ontology provides the domain schema, while the instance level data is stored in various backend data stores (also referred to as data sites and data nodes). In embodiments, the data nodes can include any store architecture, including relational database(s), inverted index document store(s), JavaScript Object Notation (JSON) store(s), graph database(s), and the like.

In some embodiments, the system can move, store, and index the KB data in any backend that provides the needed capability for the query types to be supported. In other words, the system need not federate the data across existing operational data stores. This is distinctly different from federated databases and mediator-based approaches. In some embodiments, the system performs a capability-based data placement step, where knowledge base data conforming to a given ontology is stored in the variety of backend resources. In at least one embodiment, the poly store architecture is configured to minimize data movement between different data stores, as data movement not only incurs data transfer costs, but also expensive data conversion costs. One solution to minimize data movement costs is to replicate the data in all backend nodes, ensuring that queries can be answered by a single store without any data movement. However, this also requires wasteful duplication, and defeats the purpose of using a poly store architecture to leverage the different capabilities of the multiple data stores. In embodiments of the present disclosure, the KB data may be stored in any number of backend resources, and the system intelligently routes queries to choose the most appropriate data store(s) and minimize data movement costs.

In some embodiments described herein, the system architecture provides appropriate abstractions to query the data without knowing how the data is stored and indexed in the multiple data stores. In one embodiment, to accomplish this purpose, an Ontology Query Language (OQL) is introduced. The OQL is expressed against the domain ontology for the enterprise. Users of the system need only know about the domain ontology which defines the entities and their relationships. In embodiments, the system understands the mappings of the various ontology concepts to the backend data stores, as well as their corresponding schemas, and provides query translators from OQL to the target query language of the underlying system.

In embodiments, for any given query, one or more data nodes may be involved. Embodiments of the present disclosure provide techniques to identify the stores that are involved and generate the appropriate sub-queries to compute the final query result. In some embodiments, the system does not use a mediator approach, where a global query is divided into multiple sub-queries and the final results are assembled in the mediator. Instead, one or more of the data stores are used as the mediator, and the backend data store(s) finalize the query answers. For example, in one embodiment, the relational database is used to finalize the query response, as the relational store is likely to be able to quickly complete join operations.

FIG. 1 illustrates an Architecture 100 configured to route ontological queries, according to one embodiment disclosed herein. In the illustrated embodiment, a Query Processing Orchestrator 115 receives Ontological Queries 105 constructed using an OQL, which has a corresponding Ontology Schema 110. The Ontological Queries 105 are processed by the Query Processing Orchestrator 115 to identify and return relevant data. In embodiments, the Query Processing Orchestrator 115 routes the queries to a Backend 125 comprising a variety of Data Nodes 130A-N. In the illustrated embodiment, this routing is performed based at least in part on a set of Concept Mappings 140 and Capabilities 135.

In the illustrated embodiment, the Ontological Queries 105 are formatted based on an OQL that is used to represent queries that operate on the set of concepts and relationships in the Ontology Schema 110. In an embodiment, the OQL can express queries including aggregations, unions, nested subqueries, and the like. In some embodiments, OQL can also express full-text and fielded search predicates, as well as path queries. An OQL query generally consists of a single query block or a union of multiple OQL query blocks, where each OQL query block consists of a SELECT clause and a FROM clause. In some embodiments, an OQL block can also contain a WHERE clause, a GROUP BY clause, an ORDER BY clause, A FETCH FIRST clause, and/or a HAVING clause. In embodiments, the OQL query operates on the set of tuples constructed by the Cartesian product of the concepts referred to in the FROM clause.

In an embodiment, the Ontology Schema 110 describes the entities and their relationships in a KB at a semantic level, irrespective of how the data is actually stored in backend resources. In one embodiment, the Ontology Schema 110 describes the entities relevant to the domain, the properties potentially associated with the various entities, and the potential relationships among different entities. The Ontology Schema 110 can provide a rich and expressive data model capturing a variety of real-world relationships between entities, such as functional, inheritance, unions, and the like. In some embodiments, the Ontology Schema 110 does not include instance data. That is, the Ontology Schema 110 defines the entities and relationships, but does not include data relating to particular entities or relationships in the KB. For example, the Ontology Schema 110 may define that a "company" entity can have several properties such as "name" and "address," but the Ontology Schema 110 does not include data for particular instances, such as a company with the name "Main Street Grocer" and address "123 Main Street." Instead, this instance data is maintained separately in the Backend 125.

In an embodiment, the Concept Mappings 140 indicate the correspondence between the logical schema represented by the Ontology Schema 110 and the physical schema of the underlying Data Nodes 130 in the Backend 125. For example, suppose the Ontology Schema 110 is defined as $O(C, R, P)$ where $C=\{c_n|1\leq n\leq N\}$ denotes a set of concepts (also referred to as entities), $R=\{r_k|1\leq k\leq K\}$ denotes a set of relationships between the concepts/entities, and $P=\{P_m|1\leq m\leq M\}$ is a set of data properties. In one embodiment, each relationship is between two or more concepts, while each data property corresponds to a characteristic of a concept. In the illustrated embodiment, the Concept Mappings 140 indicate the mapping between concepts, relationships, and properties (defined in the Ontology Schema 110) and the underlying Data Nodes 130. That is, in one such embodiment, the Concept Mappings 140 indicate each Data Node 130 that stores a given concept (e.g., entity), relationship, and/or property. For example, the Concept Mappings 140 may indicate that instances of the "company" entity are stored in the Data Nodes 130A and 130M, while data relating to a particular type of relationship between "company" entities is stored in Data Node 130B.

In one embodiment, the Capabilities 135 indicate the operations and capabilities provided by each Data Node 130. In some embodiments, the capabilities of a Data Node 130 is expressed as views that enumerate all possible queries (view definitions) that can be handled/answered by the data store. This approach, although flexible, is not scalable as the number of view definitions can be very large, potentially leading to the problem of query rewriting using infinite number of views. To improve scalability, some embodiments of the present disclosure describe the capabilities of the backend Data Nodes 130 in terms of the operations that they support (e.g., join, group by, aggregation, fuzzy-text matching, path expressions, and the like) rather than enumerating all possible queries that can be answered by the data stores. Additionally, at least one embodiment of the present disclosure provides a finer grained description of each supported operation by utilizing a mechanism to express any associated limitations. For example, in one such embodiment, an aggregation function of type MAX might only be supported over numeric types.

Thus, in one embodiment, the Capabilities 135 indicate, for each given Data Node 130, the set of operations the node can complete (as well as relevant limitations on that capability, in some embodiments). In an embodiment, the Query Processing Orchestrator 115 evaluates the Capabilities 135 and Concept Mappings 140 to select one or more Data Nodes 130 to which the received Ontological Query 105 should be routed. To do so, in one embodiment, the Query Processing Orchestrator 115 identifies Data Nodes 130 which either contain the needed data (e.g., based on the Concept Mappings 140), are able to complete the needed operation(s) (e.g., based on the Capabilities 135), or both. The Query Processing Orchestrator 115 can then generate sub-queries for each selected Data Node 130.

In embodiments, the Query Processing Orchestrator 115 uses a set of Translators 120A-N to translate the subqueries as needed. In the illustrated embodiment, each type of Data Node 130 has a corresponding Translator 120. In some embodiments, each Translator 120A-N receives all or a portion of an OQL query and generates an equivalent query in the language and/or syntax of the corresponding Data Node 130A-N. For example, the Translator 120A may generate SQL queries for a relational database contained in Data Node 130A, while the Translator 120B outputs graph queries for a graph store contained in Data Node 130B.

In an embodiment, the Translators 120 rely on schema mappings that map concepts and relations represented in the domain ontology to appropriate schema objects in the target physical schema. For example, for a relational backend Data Node 130, the schema mappings can provide a correspondence between (1) the concepts in the ontology and the tables in the relational schema; (2) data properties or attributes of concepts in the ontology and the table columns in the physical schema; and/or (3) the relations between concepts in the ontology and the primary key-foreign key constraints between the tables that correspond to the concepts in the database. Similarly, for a JSON document store, the schema mappings may map the concepts, data properties, and relations represented in the ontology to appropriate field paths in the JSON document.

In some embodiments, the Translators 120 also handle special concepts and relations that can be represented in an ontology, such as union, inheritance, and traversals between concepts that typically represent join conditions between the ontology concepts. Depending on the physical data layout, these are translated to appropriate operations supported by the Backend 125 Data Nodes 130.

In embodiments, each Data Node 130 receives subqueries and generates a response for the Query Processing Orchestrator 115. If the Data Node 130 has all of the necessary data locally and is able to complete the indicated operation(s), the node executes the query and returns results. In some embodiments, the subquery can indicate that the Data Node 130 should transmit a query to one or more other Data Nodes 130 to retrieve data needed to complete the query. For example, in some embodiments, it is preferred that join operations be performed by a relational data node, as relational systems tend to have low latency for join operations. Additionally, some operations are only possible on certain nodes. For example, suppose the Data Node 130A is the only node which can complete join operations, but the data to be joined exists only on the Data Node 130B. In one embodiment, the Data Node 130A receives a subquery instructing it to join the relevant data, as well as one or more other subqueries to be forwarded to the Data Node 130B to retrieve the data.

That is, in one such embodiment, the Query Processing Orchestrator 115 prepares translated subqueries for the Data Node 130B, and transmits them to the Data Node 130A. This allows the Data Node 130A to simply forward them to the Data Node 130B. The data is then returned by Data Node 130B to the Data Node 130A, which completes the operation and returns the results to the Query Processing Orchestrator 115. In another embodiment, the Query Processing Orchestrator 115 may transmit the subqueries to the Data Node 130B, and forward the resulting data to the Data Node 130A for processing. In still another embodiment, the Query Processing Orchestrator 115 performs the join locally.

In the illustrated embodiment, the architecture 100 further includes a Data Placement Orchestrator 150, which determines which Data Node(s) 130A-N should be used to store the data in the knowledge base. As illustrated, the Data Placement Orchestrator 150 receives a similar indication of the Capabilities 155 of the Data Nodes 130, as well as an indication of the Query Workload 160. In one embodiment, the Query Workload 160 indicates the average or expected set of queries for the knowledge base. For example, in one embodiment, the Query Workload 160 is generated by observing user interactions with the knowledge base over time. The system can then aggregate these interactions to determine the average, expected, or typical workload for the system. In some embodiments, the Query Workload 160 includes an indication of which concept(s) are queried together, which operation(s) are applied to each concept, and the like.

In embodiments, based on the node Capabilities 155 and the known Query Workload 160, the Data Placement Orchestrator 150 determines, for each concept/entity in the Ontology Schema 110, which Data Node(s) 130 should store instance-level data for the concept. For example, based on the operations a given Data Node 130A can perform and further based on the Query Workload 160, the Data Placement Orchestrator 150 may determine that the Data Node 130A should store all data for a "company" entity and "public metric" entity, because they are often queried together. Similarly, the Data Placement Orchestrator 150 may determine to place instances of a "document" concept in the Data Node 130B, based on determining that the queries frequently include performing fuzzy match operations on the "document" data, and the Data Node 130B supports fuzzy match.

This intelligent data placement can reduce subsequent data transfers during runtime. In embodiments, the Data Placement Orchestrator 150 may be utilized at the outset (e.g., to provide the initial placements), and/or periodically during runtime (e.g., to reform the placement decisions based on how the Query Workload 160 has evolved over time). Although depicted as discrete components for conceptual clarity, in embodiments, the operations of the Query Processing Orchestrator 115 and Data Placement Orchestrator 150 may be combined or distributed across any number of components.

As illustrated, the Data Placement Orchestrator 150 outputs a set of Placement Decisions 165 to the Backend 125, and/or to one or more intermediate services such as an extract, transform, and load (ETL) service. The instance-level data in the knowledge base is then stored in the appropriate Data Nodes 130 based on these selections. The Concept Mappings 140 reflect the current placement of data. In an embodiment, if the Data Placement Orchestrator 150 is used to revise the data placement based on updated Query Workloads 160, the Concept Mappings 140 are similarly updated. In the following, FIG. 2 through FIG. 9 discuss the Query Processing Orchestrator 115 in more detail, and presume that the data has already been placed. The Data Placement Orchestrator 150 and various techniques to ensure efficient data placement are discussed in more detail with reference to FIGS. 10 through 17.

Figure 2:
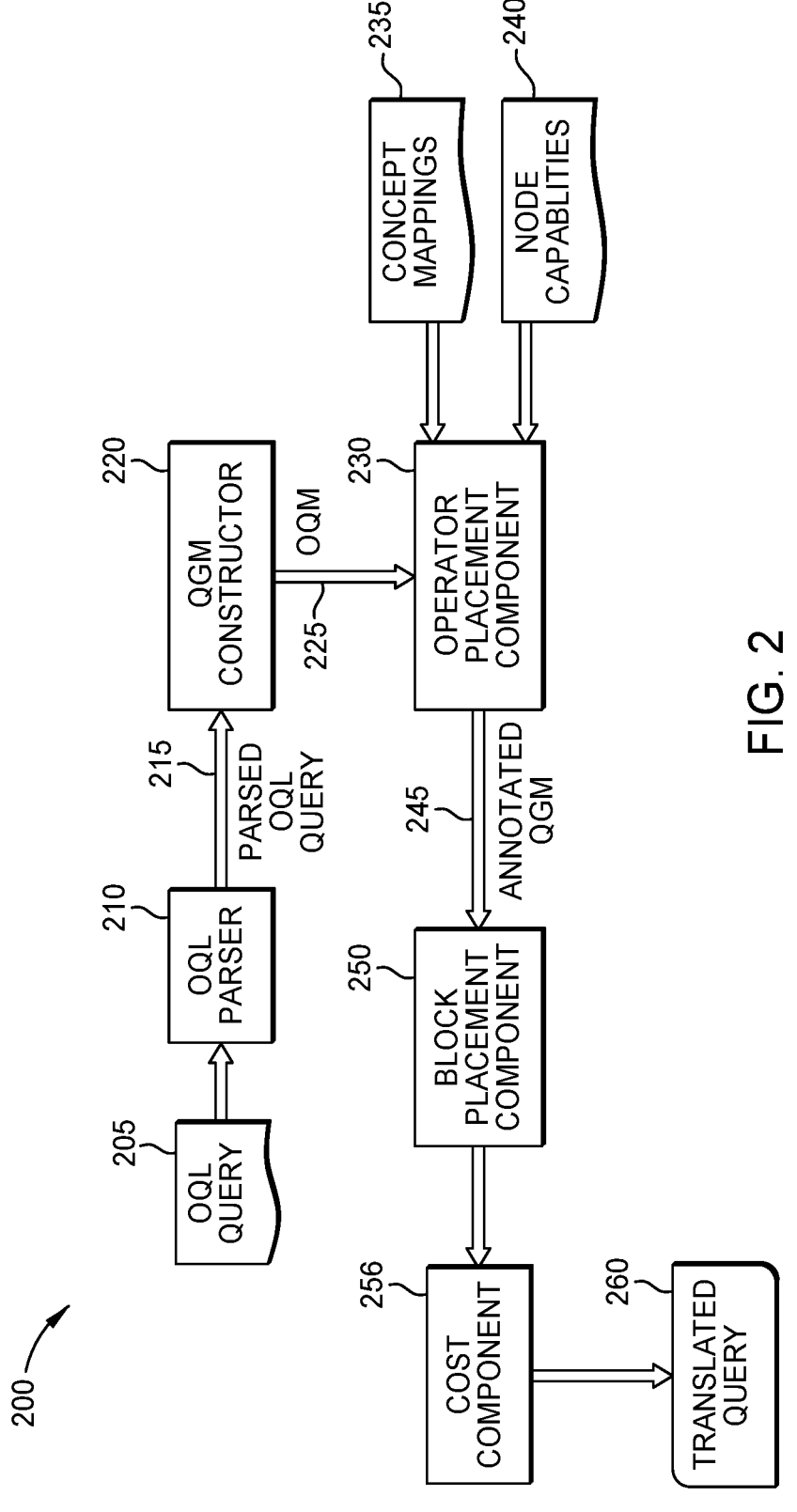
FIG. 2 illustrates a workflow for processing and routing ontological queries, according to one embodiment disclosed herein.

FIG. 2 illustrates a workflow 200 for processing and routing ontological queries, according to one embodiment disclosed herein. As illustrated, the workflow 200 begins when an OQL Query 205 is received. The OQL Query 205 is provided to an OQL Parser 210, which parses the query to determine the meaning of the query. As illustrated by arrow 215, this parsed OQL query is then provided to a Query Graph Model (QGM) Constructor 220. In an embodiment, the QGM Constructor 200 generates a logical representation of the query in the form of a query graph model. This reduces the complexity of query compilation and optimization. An example query graph model is discussed in more detail below with regards to FIGS. 4A and 4B. In an embodiment, the QGM captures the data flow and dependencies in a query using operator boxes, such as SELECT, GROUP BY, SETOP, and the like. In embodiments, the operations within a box can be freely reordered among themselves, but the box boundaries are respected when generating the query execution plans. That is, the query execution plans must follow the order of the query boxes.

In one embodiment, data flow between the query boxes is represented using quantifiers. This format allows the system to reason about query equivalences, and apply rewrite optimizations. In an embodiment, the QGM representation of the query enables the system to focus on optimizing the data flow between the different data stores during query execution, while the choice of the actual physical execution plan is deferred to the underlying Data Node 130 that is responsible for the execution of the query box or fragment. In embodiments, the QGM 225 is used to produce an optimized multi-store execution plan that minimizes data movement and transformation across different back-ends.

In some embodiments, the QGM 225 includes a set of quantifiers at the bottom which provide the input concept sets to the query, and each query block in the QGM has a head and body. The body of each block includes a set of predicates describing the set operations that are to be performed on the input concept sets (such as joins), and the head expressions describe how the output properties of the result concept should be computed. Stated differently, in an embodiment, the body of each box contains a set of predicates (also referred to as operations), each of which are to be applied to the input quantifiers for the box. In some embodiments, a predicate/operation referring to a single quantifier is classified as a local predicate, while a predicate/operation that refers to multiple quantifiers expresses a join predicate.

In the illustrated workflow 200, the QGM 225 is passed to an Operator Placement Component 230 which continues the query routing process. As illustrated, the Operator Placement Component 230 further receives the set of Concept Mappings 235 and Node Capabilities 240, and annotates the query blocks in the QGM 225 based on the capabilities and concept mappings. In one embodiment, the Operator Placement Component 230 walks the QGM from the bottom to the top, and annotates each operation in the query with the set of possible stores where the operation can be performed. In some embodiments, annotations are generated differently for local and join predicates. Recall that in some embodiments, all head expressions that are associated with a single quantifier are treated in the same way as local predicates.

In one embodiment, if the query block includes a local predicate/operation (e.g., a single quantifier), the Operator Placement Component 230 determines whether the quantifier is a base concept. If so, the predicate is annotated with an indication of the Data Node(s) 130 that both (i) contain the concept and (ii) have the capability to execute the predicate. In an embodiment, if the quantifier is coming from another QGM block (i.e., it is computed by another block), the Operator Placement Component 230 annotates the predicate with the set of data stores that (i) complete the QGM box of this quantifier, and (ii) are capable of executing the predicate. In some embodiments, if none of the Data Nodes 130 that contain the input to this predicate also have the capability to execute the predicate, the Operator Placement Component 230 annotates it with the set of stores that are able to execute the predicate.

For example, if the predicate contains fuzzy search but the data is only stored in the relational backend Data Node 130, the Operator Placement Component 230 can annotate the predicate with a document store that is able to compute that fuzzy search, even though the data is not stored there. Note that the data will need to be moved in such cases during query execution.

In some embodiments, if the query block includes a join predicate/operation, the Operator Placement Component 230 examines the join type and the join predicate. In an embodiment, each join predicate is associated with two or more quantifiers: one for each of the join inputs. In embodiments, the Operator Placement Component 230 identifies these quantifiers proceeds based on whether the identified quantifiers are computed inputs or base concepts, as well as where the quantifier comes from (e.g., whether it is computed and/or stored locally, or will be received from another node).

In the event that all of the quantifiers range over base concepts, the Operator Placement Component 230 evaluates the set of Data Nodes 130 where any of the base concepts reside, and determines, for each such store, whether the store supports join operations. The Operator Placement Component 230 then annotates the join operation with an indication of the stores that contain one or more of the needed concepts, and support the type of join operation. In some embodiments, if one of the stores is a relational node, the Operator Placement Component 230 annotates the operation with an indication of this relational Data Node 130 rather than the remaining nodes.

In some embodiments, if both the quantifiers are produced by other QGM query blocks, the Operator Placement Component 230 annotates the join operation with the Data Nodes 130 that support the join operation type (in some embodiments, including only relational stores). In an embodiment, the Operator Placement Component 230 further annotates the operation with an indication of the data stores that produce the quantifiers, if they are capable of executing the JOIN.

In a further embodiment, if one of the quantifiers is a base concept and another is computed from another QGM query block, the join operation placement decision is similar to the above discussion when the quantifiers are both computed by other QGM blocks. In an embodiment, the Operator Placement Component 230 annotates the join operation with the set of data stores that support the join type and are local to at least one of the join inputs.

As illustrated, this Annotated QGM 245 is then passed to the Block Placement Component 250. In an embodiment, the Block Placement Component 250 utilizes the annotations generated by the Operator Placement Component 230 to determine the possible placement options for the query boxes in the query.

In one embodiment, determining the placement options for "select" query boxes is modeled as a problem of determining the minimum set cover. That is, the Block Placement Component 250 determines the minimum number of Data Nodes 130 that are required to satisfy the placement of all the operators within the given select box. In some embodiments, the Block Placement Component 250 utilizes a greedy heuristic for performing the predicate-store grouping which guarantees that each predicate is placed in a single store, and the total number of stores spanned by the query box is minimized. Once each predicate is annotated with the appropriate store where it will be placed, the Block Placement Component 250 determines whether the query block needs to be split.

In an embodiment, if all the predicates in the select query box are placed in the same Data Node 130, the query box is annotated to be placed in that store. In contrast, if the predicates in the select query box are placed in more than one Data Node 130 (indicating that the query box needs to be processed by multiple stores), the Block Placement Component 250 determines that the block must be split into multiple query boxes. In that case, the Block Placement Component 250 then divides the block such that each resulting (sub-)block includes predicates assigned to a single data node.

In some embodiments, for "group by" query boxes, the Block Placement Component 250 determines the placement based on the stores that support the type of aggregation operation, and the store processing the preceding query box that feeds the group by box. In an embodiment, if the store feeding these inputs also supports the group by and aggregation functions, then the Block Placement Component 250 places the selected "group by" box in the same store. However, if that store does not support these operations, the Block Placement Component 250 annotates the box with a list of the Data Nodes 130 that can execute the group by operation. Note that such a placement would necessitate data movement from the feeding store to the store that can process the box.

Once the Block Placement Component 250 has annotated each query block with all possible placement(s) of each (e.g., all Data Nodes 130 which can execute the block), the Cost Component 255 determines the cost of each combination of placements. In one embodiment, the cost model for query routing focuses only on data transfer and data conversion costs in order to choose between alternative query execution plans, as the cost of data movement and transformation is likely to dominate the overall cost of any execution plan in the poly store environment. In at least some embodiments, therefore, the cost of a given execution plan execution is determined by aggregating the cost of data movement for each source and target data store pair in the query execution plan. Note that in some embodiments, different operations such as joins and graph operations may be executed with very different performance on different Data nodes 130. For example, although join operations might be supported by a variety of data stores (such as JSON stores), relational databases typically provide the best performance for join operations.

In some embodiments, the cost model further considers this variance in the execution costs of the operations for different stores. In other embodiments, the cost model does not include these factors. In one such embodiment, such cases are handled using a declarative mechanism of expressing the capabilities of the underlying stores. For example, to avoid the execution of a join operation on a JSON store, the system can mask the join capability of JSON stores completely in the capability description, or add limitations to restrict its applicability for certain data types.

In an embodiment, the Cost Component 255 enumerates over all possible placement combinations across all query blocks, and generates an execution plan for each such combination by grouping together certain query boxes into groups. In one embodiment, each group in the query plan includes query boxes that are both (i) consequent in the QGM (e.g., separated by a single hop) and (ii) can be processed by the same Data Node 130. The Cost Component 255 then connects these groups of blocks based on the QGM flow, defining edges representing the data flow between Data Nodes 130. In an embodiment, the Cost Component 255 further generates a set of data movement descriptors for each execution plan, based on the edges between groups in the generated plan.

In some embodiments, using these movement descriptors for each plan, the Cost Component 255 utilizes the data movement cost model described above to find a cost for each execution plan, and picks the one with the minimum cost. For example, in one embodiment, the Cost Component 255 determines, for each possible execution plan, a cost of each of the corresponding movement descriptors. This may include latency, computing costs, and the like. The values can then be aggregated within each execution plan, in order to determine which execution plan(s) have the lowest cost. As illustrated, this minimum cost plan is then selected and used to generate one or more Translated Queries 260 for the Data Nodes 130.

Figure 3A:
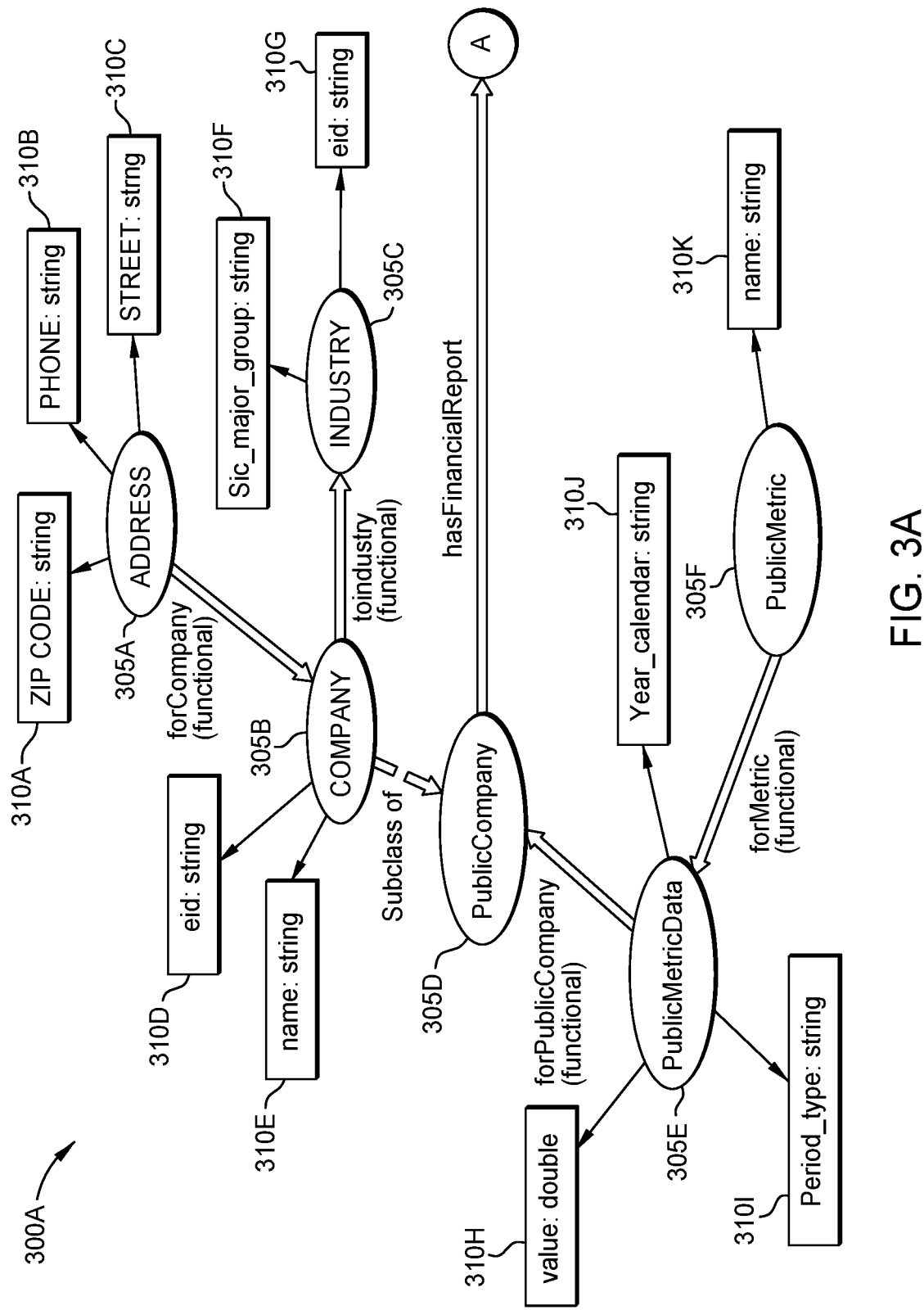
FIGS. 3A and 3B depict an example ontology that can be used to evaluate and route queries, according to one embodiment disclosed herein.
Figure 3B:
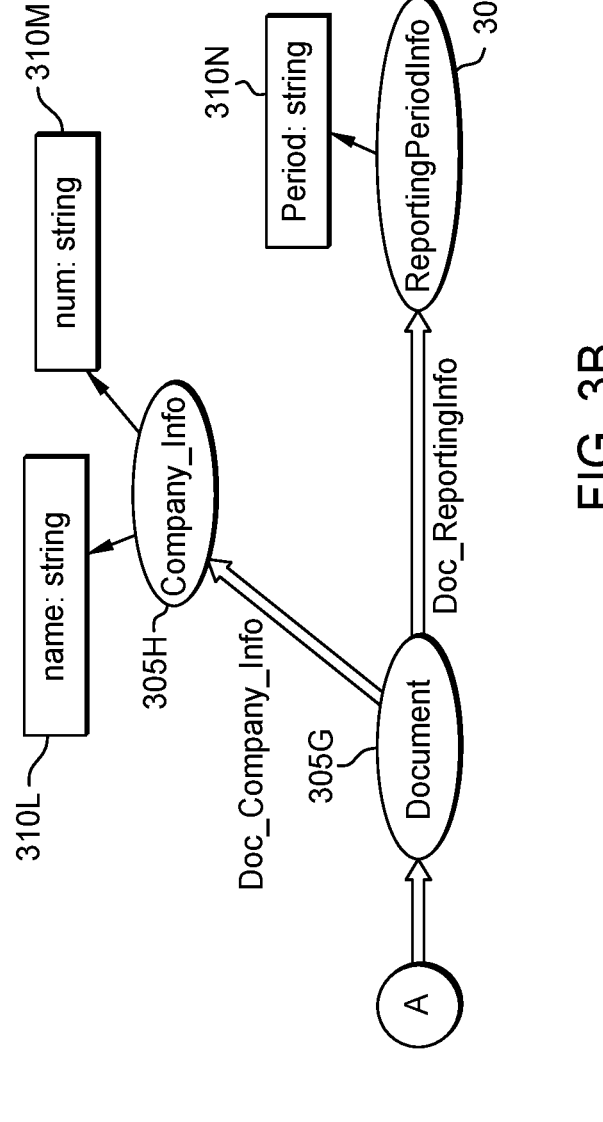

FIGS. 3A and 3B depict an example Ontology 300 that can be used to evaluate and route queries, according to one embodiment disclosed herein. In the illustrated embodiment, each Concept 305A-I is depicted using an ellipse, while each Property 310A-N is depicted using a rounded rectangle. Further, arrows are used to depict the associations between Concepts 305 and Properties 310, while bolded arrows depict the relationships between Concepts 305. Additionally, each relationship arrow is labeled based on the type of the relationship. For example, as illustrated, the "Company" Concept 305B is a subclass of the "PublicCompany" Concept 305D. Further, the Company Concept 305B is associated with several Properties 310, including a "name" Property 310E and an identifier Property 310D, both of which are strings.

As discussed above, in an embodiment, the data in the knowledge base conforms to the Ontology 300. Stated differently, the Ontology 300 defines the concepts and entities in the knowledge base, as well as the relationships between the entities and the properties associated with each concept. Notably, the Ontology 300 does not include any instance data (e.g., data about a specific company), but instead defines the structure of the data. In some embodiments, the Concepts 305, Properties 310, and/or relationships may be distributed across any number of Data Nodes 130. In one embodiment, the data is placed in the Data Nodes 130 based at least in part on the type of the data.

In one such embodiment, if the concept mappings indicate that a given Concept 305 is stored in a given Data Node 130, all instance data that corresponds to that Concept 305 is stored in the Data Node 130. For example, if the mapping indicates that a Data Node 130A includes the "PublicMetric" Concept 305F, the Query Processing Orchestrator 115 can retrieve data about any instance of the "PublicMetric" (e.g., any metric, for any company) from the Data Node 130A. Thus, if a received query will require accessing "PublicMetric" data, the Query Processing Orchestrator 115 will route at least a portion of the query to the Data Node 130A (or to another node that also serves the Concept 305F).

Figure 4A:
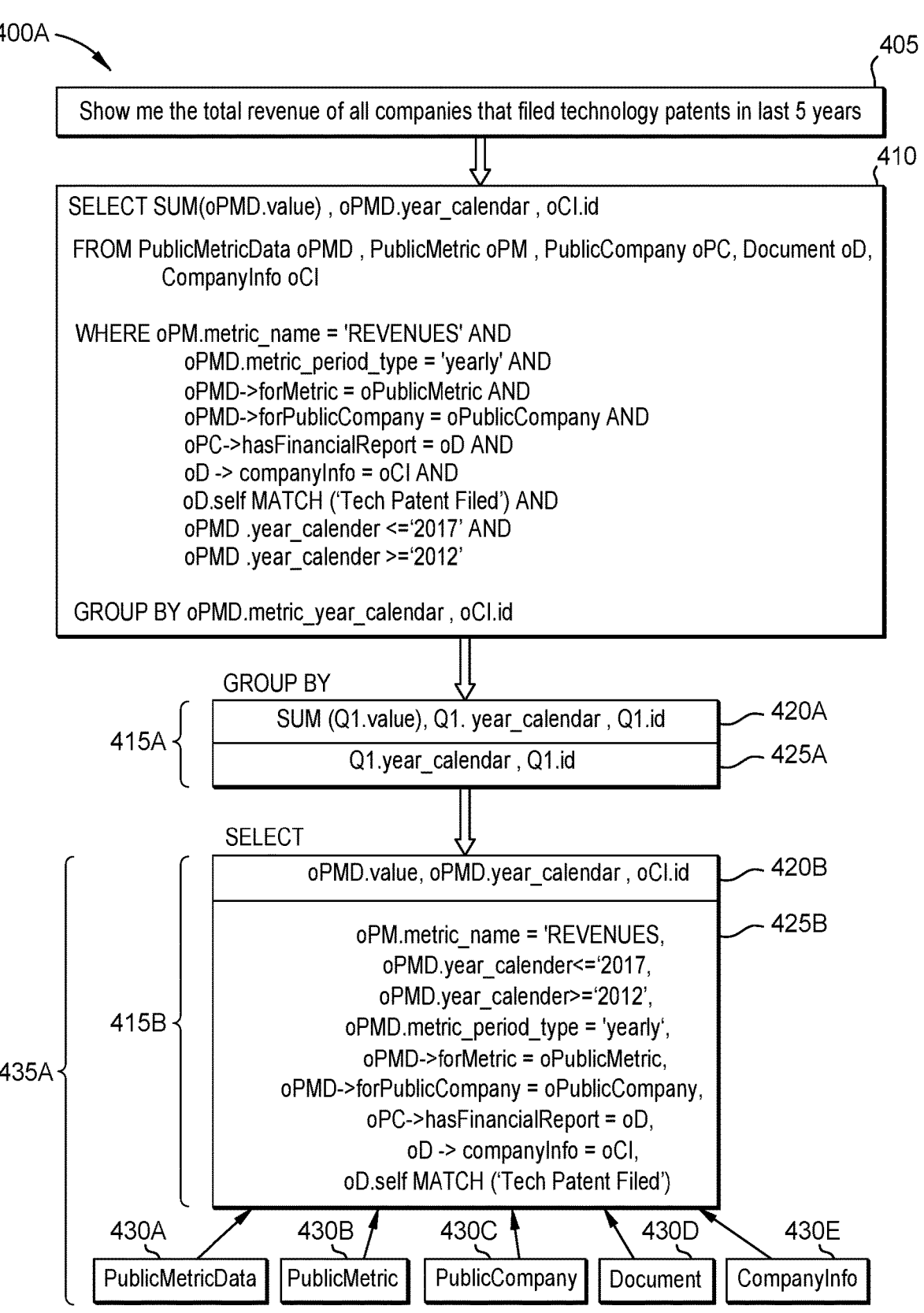
FIGS. 4A and 4B illustrate a workflow for parsing and routing an example ontological query, according to one embodiment disclosed herein.
Figure 4B:
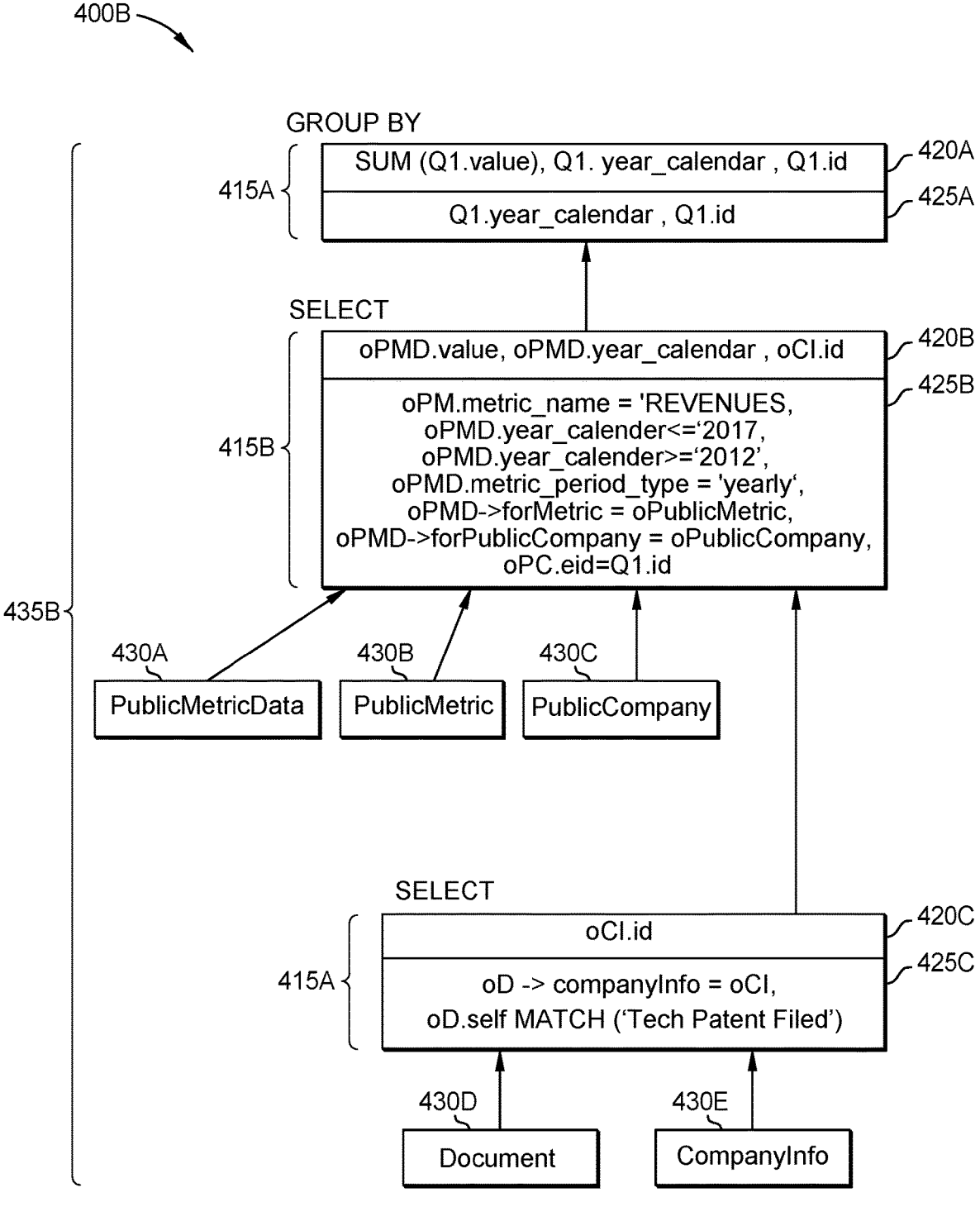

FIGS. 4A and 4B illustrate a workflow 400 for parsing and routing an example ontological query, according to one embodiment disclosed herein. In the illustrated embodiment, Input 405 is received and evaluated to retrieve relevant data from the Data Nodes 130. In the illustrated embodiment, the Input 405 is natural language text (e.g., from a user). In various embodiments, however, the Input 405 may include a query or other data. Further, the Input 405 may be received from any number of sources, including automated applications, user-facing applications, directly from a user, and the like. In some embodiments, the Input 405 is received as part of a chat bot or other interactive application that allows the user to search and explore the knowledge base.

In the illustrated example, the Input 405 is a phrase "Show me the total revenue of all companies that filed technology patents in the last 5 years." In the illustrated workflow 400, the Input 405 is parsed and evaluated using one or more natural language processing (NLP) techniques such as semantic analysis, keyword searching, sentiment analysis, intent analysis, and the like. This enables the system to generate an OQL Query 410 based on the Input 405. Of course, in some embodiments, the Input 405 itself is an OQL query.

As illustrated, the corresponding OQL Query 410 for the Input 405 includes a "select" operation and a "group by" operation, as well as an indication as to the tables or concepts that are relevant, and a "where" clause indicating the limitations on the query. This OQL Query 410 is then parsed by the Query Processing Orchestrator 115 to generate an OGM 435A, which is a logical representation of the query, and includes a number of query blocks. In the illustrated embodiment, the OGM includes a "select" Query Block 415B, and a "group by" Query Block 415A.

As illustrated, the QGM 435A includes a set of Quantifiers 430A-E at the bottom, which provide the input concept sets to the query. In the illustrated embodiment, these include "PublicMetricData," "PublicMetric," "PublicCompany," "Document," and "CompanyInfo." In an embodiment, each Query Block 415 in the QGM 435A includes has a Head 420 and Body 425. The Body 425 generally describes the set operations that are to be performed on the input concept sets (such as joins), while the Head 420 expressions describe how the output properties of the result concept should be computed. For example, in the illustrated embodiment, the Head 420B of the "select" Query Block 415B specifies output properties "oPMD.value," "oPMD.year_calendar," and "oCI.id." The Body 425B contains a set of predicates to be applied on the input Quantifiers 430A-E. As discussed above, in embodiments, a predicate referring to a single quantifier is a local predicate, while a predicate that refers to multiple quantifiers expresses a join predicate.

As illustrated in FIG. 4B, because the Query Processing Orchestrator 115 recognizes that the "select" Query Block 415B includes predicates that must be executed by differing Data Nodes 130. Specifically, although most of the predicates in the Query Block 415B can be executed by a relational data store, the Query Processing Orchestrator 115 has determined that the predicates "oD→companyInfo=oCI" and "oD.selfMATCH('Tech Patent Filed')" correspond to operations that are performed using an elastic search, which the relational database node does not support. Thus, the Query Processing Orchestrator 115 has split the Query Block 415B by separating out these predicates into a new Query Block 415C. As illustrated, this Query Block 415C acts as input to the Query Block 415B.

In the illustrated embodiment, by splitting the Query Block 415B, the Query Processing Orchestrator 115 has ensured that each block can be executed entirely within a single Data Node 130. For example, both the Query Block 415A and 415B can be executed in a relational Data Node 130, while the Query Block 415C is to be executed by a Data Node 130 supporting elastic search. In an embodiment, therefore, the Query Processing Orchestrator 115 identifies or generates a subquery corresponding to Query Blocks 415A and 415B, translates the subquery to the appropriate language and/or format of the relational node, and transmits the translated subquery to the relational node.

In the illustrated embodiment, the Query Processing Orchestrator 115 will further identify or generate a subquery to accomplish the Query Block 415C, and translate it to a language and/or format supported by the elastic search node. In one embodiment, the Query Processing Orchestrator 115 additionally transmits this subquery to the relational data store, which is to act as the aggregator. The relational node can then forward the subquery to the elastic node, and complete its own subquery using the results returned by the elastic node.

Figure 5:
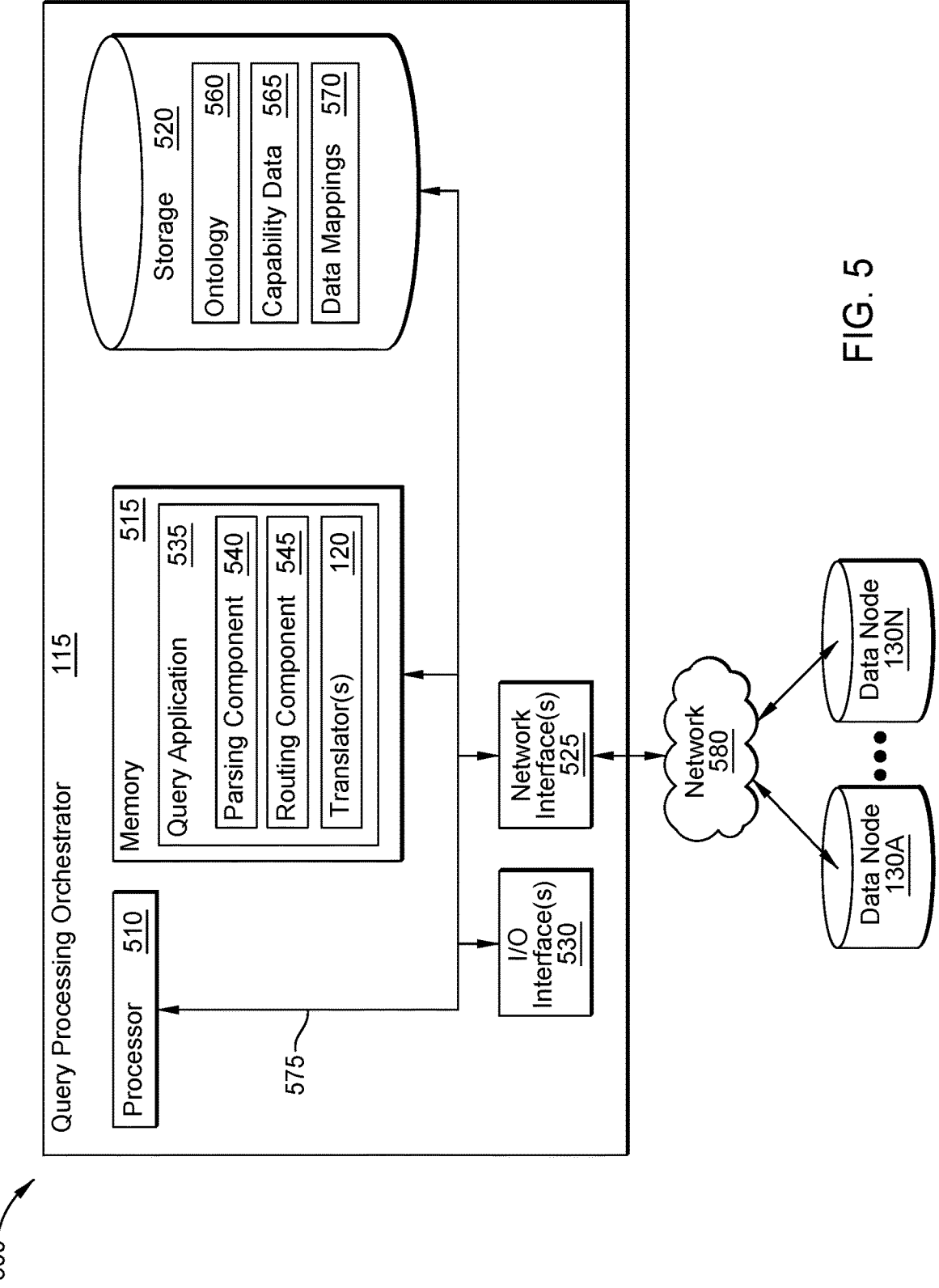
FIG. 5 is a block diagram illustrating a query processing orchestrator configured to route ontological queries, according to one embodiment disclosed herein.

FIG. 5 is a block diagram illustrating a Query Processing Orchestrator 115 configured to route ontological queries, according to one embodiment disclosed herein. Although depicted as a physical device, in embodiments, the Query Processing Orchestrator 115 may be implemented using virtual device(s), and/or across a number of devices (e.g., in a cloud environment). As illustrated, the Query Processing Orchestrator 115 includes a Processor 510, Memory 515, Storage 520, a Network Interface 525, and one or more I/O Interfaces 530. In the illustrated embodiment, the Processor 510 retrieves and executes programming instructions stored in Memory 515, as well as stores and retrieves application data residing in Storage 520. The Processor 510 is generally representative of a single CPU and/or GPU, multiple CPUs and/or GPUs, a single CPU and/or GPU having multiple processing cores, and the like. The Memory 515 is generally included to be representative of a random access memory. Storage 520 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 530. Further, via the Network Interface 525, the Query Processing Orchestrator 115 can be communicatively coupled with one or more other devices and components (e.g., via the Network 580, which may include the Internet, local network(s), and the like). As illustrated, the Processor 510, Memory 515, Storage 520, Network Interface(s) 525, and I/O Interface(s) 530 are communicatively coupled by one or more Buses 575. Additionally, the Query Processing Orchestrator 115 is communicatively coupled to a number of Data Nodes 130A-N via the Network 580. Of course, in embodiments, the Data Nodes 130A-N may be directly connected to the Query Processing Orchestrator 115, accessible via a local network, integrated into the Query Processing Orchestrator 115, and the like. Although not included in the illustrated embodiment, in some embodiments, the Query Processing Orchestrator 115 is further communicatively coupled with the Data Placement Orchestrator 150.

In the illustrated embodiment, the Storage 520 includes the Ontology 560, Capability Data 565, and Data Mappings 570. Although depicted as residing in Storage 520, in embodiments, the Ontology 560, Capability Data 565, and Data Mappings 570 may be stored in any suitable location and manner. In an embodiment, as discussed above, the Ontology 560 indicates the entities or concepts that are relevant for the domain in which the Query Processing Orchestrator 115 operates, as well as the potential properties of each concept/entity and the relationships between and among the entities/concepts. In at least one embodiment, the Ontology 560 does not include instance-level data. Instead, the actual data in the KB is stored in the Data Nodes 130A-N.

In an embodiment, as discussed above, the Capability Data 565 indicates the capabilities of each Data node 130A-N. This may include, for example, an indication as to which operation(s) each Data Node 130A-N supports, as well as any corresponding limitation(s) on that support. For example, the Capability Data 565 may indicate that the Data Node 130A supports "join" operations, but only for integer data types. In embodiments, as discussed above, the Data Mappings 570 indicate the Data Node(s) 130 where instance data for each entity/concept defined in the Ontology 560 is stored. For example, the Data Mappings 570 may indicate that all instances of a "Company" concept are stored in Data Nodes 130A and 130B, while all instances of a "Document" concept are stored in Data Nodes 130B and 130N.

In the illustrated embodiment, the Memory 515 includes a Query Application 535. Although depicted as software residing in Memory 515, in embodiments, the Query Application 535 may be implemented using hardware, software, or a combination of hardware and software. As illustrated, the Query Application 535 includes a Parsing Component 540, a Routing Component 545, and a set of Translator(s) 120. Although depicted as discrete components for conceptual clarity, in embodiments, the operations of the Parsing Component 540, Routing Component 545, and Translator(s) 120 can be combined or distributed across any number of components.

In an embodiment, the Parsing Component 540 receives OQL queries and parses them to determine their meaning and generate a logical representation of the query (such as a QGM). As discussed above, in some embodiments, the logical representation includes a set of query blocks, where each query block specifies one or more predicates defining the operations to be performed on the block's input quantifiers. In embodiments, these quantifiers may be base concept(s) stored in one or more Data Nodes 130, and/or data that is computed by another query block. In an embodiment, this logical representation enables the Query Application 535 to understand and reason about the structure of the query and how data flows between blocks. This enables the Routing Component 545 to efficiently route the query (or subqueries therefrom).

In the illustrated embodiment, the Routing Component 545 receives the logical representation (e.g., the query graph model) from the Parsing Component 540 and evaluates it to identify one or more Data Nodes 130 to which the query should be routed. In some embodiments, this includes analyzing the predicates included in each query block in the logical representation. In one embodiment, the Routing Component 545 labels or annotates each predicate in a given query block based on the Data Node(s) 130 that can complete the predicate. In some embodiments, this includes the Data Node(s) 130 that contain the relevant quantifier(s) and/or are capable of performing the indicated operation(s). Further, in at least one embodiment, once each predicate in a block has been processed, the Routing Component 545 can evaluate the annotations to determine a placement location for the block. That is, the Routing Component 545 determines whether the query block can be placed in a single Data Node 130. If so, in one embodiment, the Routing Component 545 assigns the block to that store. Further, in an embodiment, if the block cannot be processed by a single Data Node 130, the Routing Component 545 splits the block into two or more query blocks, and repeats the routing process for each.

In an embodiment, once each query block has been assigned to a single Data Node 130, the Translator(s) 120 generate one or more corresponding translated queries. In an embodiment, each Translator 120 corresponds to a particular Data Node 130 architecture, and is configured to translate OQL queries (or subqueries) to an appropriate query for the corresponding data store architecture. For example, in one such embodiment, the system may include a first Translator 120 to translate OQL to a query for a relational store (e.g., SQL), a second Translator 120 to translate OQL to a JSON query, a third Translator 120 to translate to a query for a document search, and a fourth Translator 120 to translate the OQL to a graph query.

In embodiments, the query (or subqueries) is routed to the appropriate Translator 120 based on the Data Node 130 that will execute the query or subquery. In some embodiments, each query (or subquery) is then transmitted directly to that Data Node 130 (e.g., via an application programming interface or API). In some embodiments, if the completing the query will require moving data between the Data Nodes 130 (e.g., to join data from two or more stores), the Query Application 535 can determine the flow of data based on the generated logical representation, and transmit the queries appropriately. That is, the Query Application 535 uses the QGM to determine which store(s) will need to receive data from other store(s), and transmit the needed queries to these joining stores. For example, if a Data Node 130A is to receive data from Data Node 130N and complete one or more operations on it, the Query Application 535 can transmit a first query to the Data Node 130A to retrieve data from that node, as well as a second query that is configured for the Data Node 130N. The Data Node 130A can then itself query the Data Node 130N, using the provided query.

Figure 6:
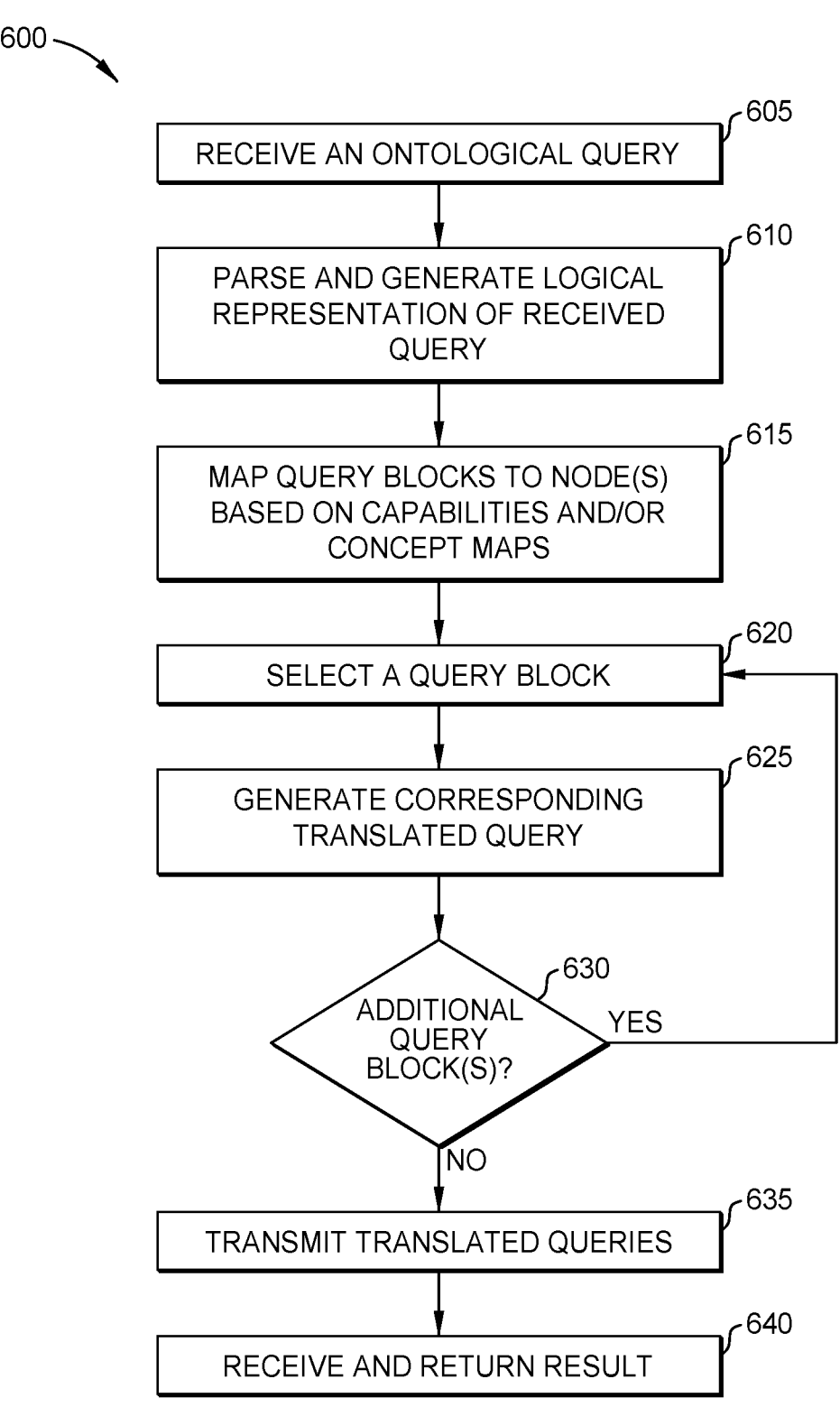
FIG. 6 is a flow diagram illustrating a method for processing and routing ontological queries, according to one embodiment disclosed herein.

FIG. 6 is a flow diagram illustrating a method 600 for processing and routing ontological queries, according to one embodiment disclosed herein. The method 600 begins at block 605, where a Query Processing Orchestrator 115 receives an ontological query for execution against a knowledge base. In an embodiment, the ontological query is expressed relative to a predefined domain ontology, where the ontology specifies the concepts, properties, and relationships that are relevant for the domain. At block 610, the Query Processing Orchestrator 115 parses the received query and generates a logical representation of it. In some embodiments, the Query Processing Orchestrator 115 generates a query graph mode representation of the query. In embodiments, the logical representation includes one or more query blocks denoting the underlying concept(s) that are implicated by the query, the operation(s) that are to be performed on the data, as well as the data flow.

The method 600 then continues to block 615, where the Query Processing Orchestrator 115 maps each query block in the logical representation to one or more data stores, based on a predefined concept mapping, and/or data store capabilities. For example, in one embodiment, the Query Processing Orchestrator 115 determines, for each query block, what concept(s) are relevant (e.g., what data the query block will access). Using the concept mappings, the Query Processing Orchestrator 115 can then identify the data store(s) that are capable of providing the needed data. Additionally, in one embodiment, the Query Processing Orchestrator 115 determines, for each query block, what operation(s) will be required. Using the predefined store capabilities, the Query Processing Orchestrator 115 can then identify which data node(s) are capable of performing the needed operation(s). The Query Processing Orchestrator 115 then maps the query block(s) to data node(s), taking effort to minimize data movement between stores.

At block 620, the Query Processing Orchestrator 115 selects one of the mapped query blocks. The method 600 then proceeds to block 625, where the Query Processing Orchestrator 115 generates a corresponding translated query for the query block, based on the mapped data store. In one embodiment, this includes identifying or generating a sub-query, from the received query, to carry out the selected query block. The Query Processing Orchestrator 115 then determines the configuration of the data node that will execute the query block. That is, in one embodiment, the Query Processing Orchestrator 115 determines the language and/or format of query that the node is configured to process. In another embodiment, the Query Processing Orchestrator 115 identifies the translator that corresponds to the mapped data store. The Query Processing Orchestrator 115 then uses this translator to generate an appropriate query for the store.

The method 600 then continues to block 630, where the Query Processing Orchestrator 115 determines whether there is at least one additional query block that has not yet been processed. If so, the method 600 returns to block 620. Otherwise, the method 600 continues to block 635, where the Query Processing Orchestrator 115 transmits the translated query or queries to one or more data nodes. In one embodiment, the Query Processing Orchestrator 115 transmits each query to the corresponding node. In another embodiment, the Query Processing Orchestrator 115 transmits the queries based on the flow of data in the logical representation. For example, the Query Processing Orchestrator 115 may transmit multiple queries to a single node, such that the node can forward the queries to the appropriate store(s) to retrieve the data. The node can then act as a mediator to finalize the results.

Advantageously, by employing one of the data nodes as mediator, the Query Processing Orchestrator 115 can reduce its computational expenses and expand scalability of the system. At block 640, the Query Processing Orchestrator 115 receives the finalized query results from the data store acting as mediator (or from the only data store to which queries were transmitted, if the received query can be executed in a single backend resource). The Query Processing Orchestrator 115 then returns the results to the requesting entity.

Figure 7:
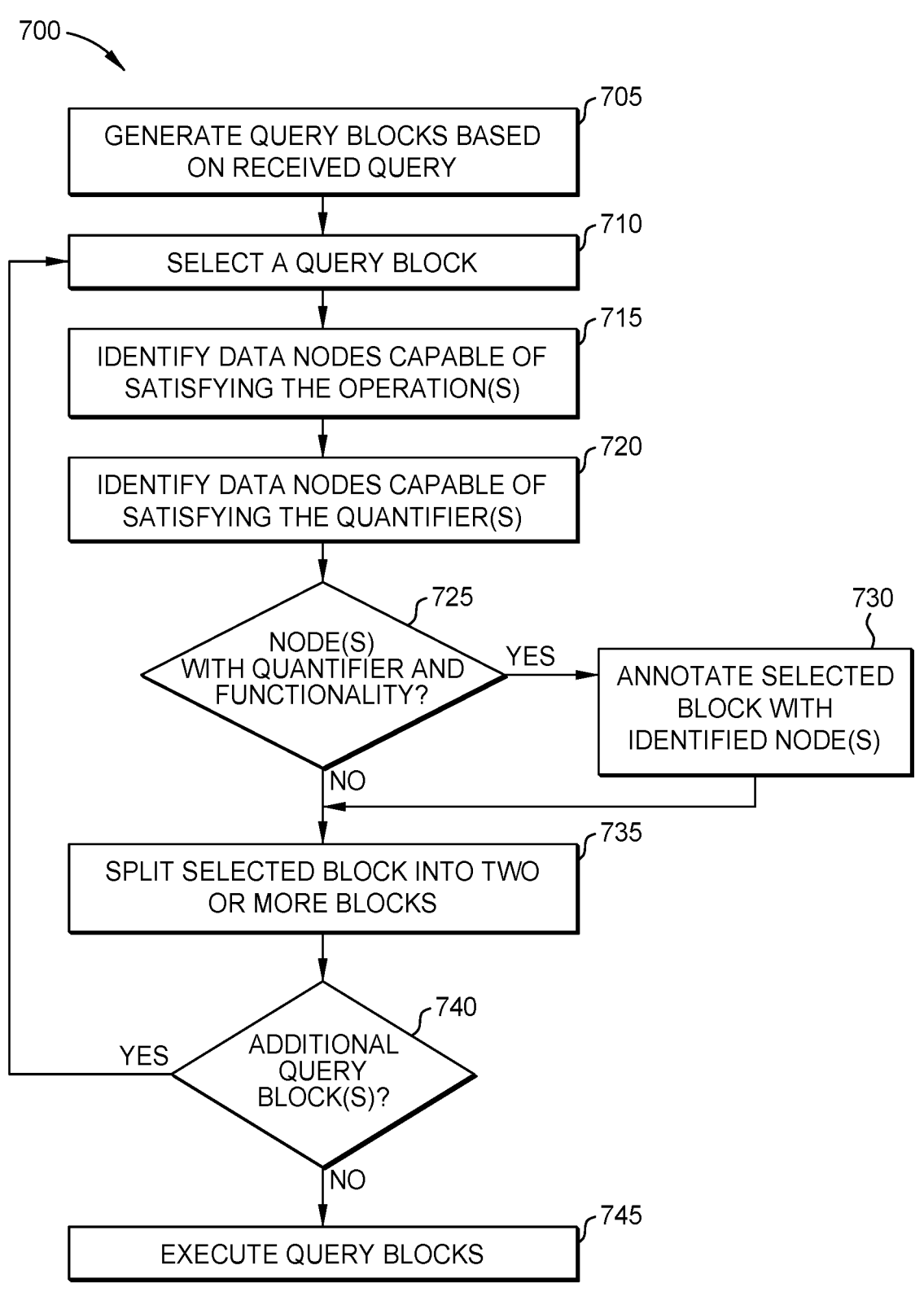
FIG. 7 is a flow diagram illustrating a method for processing ontological queries to efficiently route query blocks, according to one embodiment disclosed herein.

FIG. 7 is a flow diagram illustrating a method 700 for processing ontological queries to efficiently route query blocks, according to one embodiment disclosed herein. The method 700 provides additional detail for the routing of query blocks, in some embodiments. The method 700 begins at block 705, where the Query Processing Orchestrator 115 generates one or more query blocks to represent the received query, as discussed above. In one embodiment, each query block specifies one or more quantifiers indicating the input data for the block. These quantifiers may correspond to base concepts (e.g., instance data in the knowledge base) and/or interim computed data (e.g., data which was retrieved from a store and processed and/or transformed in some way). Additionally, in an embodiment, each query block specifies the operation(s) to be performed on the quantifiers.

At block 710, the Query Processing Orchestrator 115 selects one of the generated blocks. Further, at block 715, the Query Processing Orchestrator 115 identifies the set of data nodes that are capable of satisfying the operation(s) defined by the selected block. In one embodiment, the Query Processing Orchestrator 115 does so by accessing predefined capability definitions that define the set of operation(s) each data store can complete, as well as any corresponding limitation(s) on this capability. The method 700 then proceeds to block 720, where the Query Processing Orchestrator 115 identifies the set of nodes that are capable of satisfying the quantifier(s) listed in the query block. That is, for each quantifier corresponding to a base concept, the Query Processing Orchestrator 115 identifies nodes that store the base concept.

In one embodiment, for each quantifier that is computed by another query block, the Query Processing Orchestrator 115 identifies the data node(s) that have been assigned to that query block. Recall that in embodiments, the Query Processing Orchestrator 115 maps query blocks to nodes by walking up from the bottom of the QGM. Thus, if a first block depends on data computed in a second block, the second block will necessarily have been evaluated and assigned one or more data nodes, prior to the Query Processing Orchestrator 115 beginning evaluation of the first query block.

The method 700 then continues to block 725, where the Query Processing Orchestrator 115 determines whether there is at least one data node capable of both providing the quantifiers and executing the operations. In one embodiment, this includes determining whether there is overlap between the identified sets. For example, if the quantifiers are all base concepts, the overlap between the two sets indicates the set of nodes that are capable of executing all of the needed operations, and store all of the concepts. If the quantifiers include items computed by other query blocks, the overlapping set indicates nodes that can perform the operations, and that will (potentially) execute the other block(s).

In an embodiment, if there is overlap between the sets, the method 700 continues to block 730, where the Query Processing Orchestrator 115 annotates the selected query block with the identified nodes in the overlap. This annotation indicates that the specified nodes have the potential to execute the query block, but does not amount to a final assignment of the block to the node(s). In an embodiment, if any query block has multiple nodes included in the annotations, the Query Processing Orchestrator 115 performs cost analysis to evaluate each alternative in an effort to minimize data transfers among the stores, as discussed in more detail below. The method 700 then proceeds to block 740.

In the illustrated embodiment, if there is no overlap between the sets, the Query Processing Orchestrator 115 determines that there is no single data node that can complete the query block. In some embodiments, if all of the operations can be performed by a single store, the Query Processing Orchestrator 115 annotates the block with the store(s) that can perform the operations of the block. One or more other store(s) can then be assigned to provide the quantifiers. In the illustrated embodiment, the method 700 then continues to block 735, where the Query Processing Orchestrator 115 splits the selected query block into two or more blocks in an effort to create query blocks capable of being executed entirely within a single node. In one embodiment, splitting the selected query block includes identifying subset(s) of the quantifier(s) and/or operation(s) that can be executed by a single store. For example, the Query Processing Orchestrator 115 may identify subsets of the specified predicates that share annotations (e.g., predicates that could be executed by the same store). The query block can then be split by separating the predicates into corresponding boxes based on the subset to which they belong. For example, if a query block requires traditional relational database operations as well as a fuzzy match operation, the Query Processing Orchestrator 115 may determine that the fuzzy match(es) should be split into a separate box. This may enable the Query Processing Orchestrator 115 to assign each split block into a single data store (e.g., the relational operations can be assigned to a relational store, and the fuzzy match operations can be assigned to a different backend capable of performing it).

In the illustrated embodiment, these newly generated query blocks are placed in the queue to be evaluated, as with the existing blocks. The method 700 then continues to block 740. At block 740, the Query Processing Orchestrator 115 determines whether there is at least one additional query block that has not been evaluated. If so, the method 700 returns to block 710 to iterate through the blocks. That is, the Query Processing Orchestrator 115 continues to iterate through the query blocks, splitting the boxes if necessary, until all of the query blocks are annotated with at least one data node.

If all query blocks have been annotated, the method 700 continues to block 745, where the Query Processing Orchestrator 115 executes the query. In some embodiments, this includes evaluating the alternative combinations of assignments in order to minimize data transfer, as discussed below in more detail. In some embodiments, if the annotations of one or more of the query blocks indicate a single data node, the Query Processing Orchestrator 115 simply assigns the block to that indicated node, as there are no alternatives that can be considered.

Figure 8:
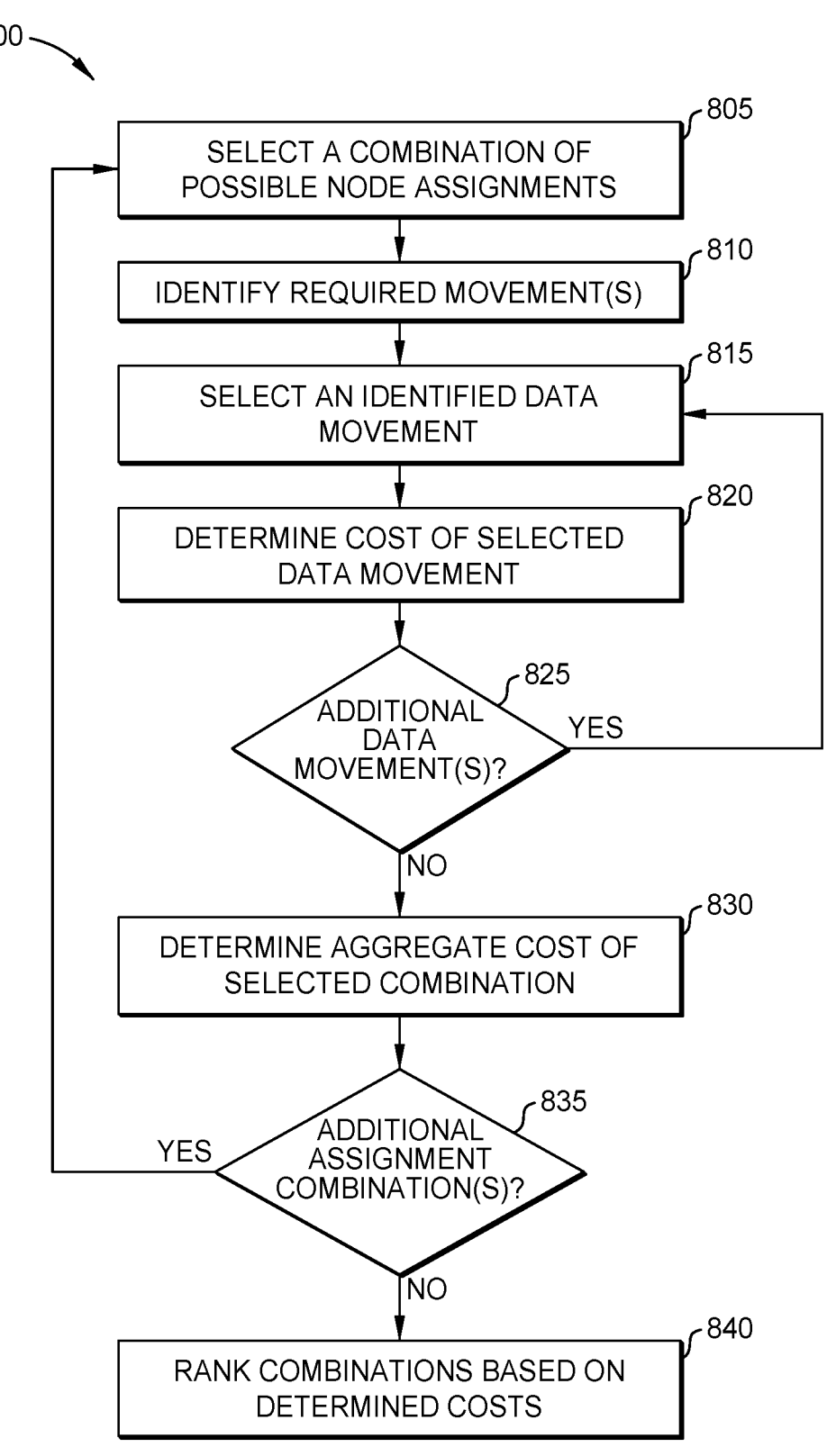
FIG. 8 is a flow diagram illustrating a method for evaluating potential query routing plans in order to efficiently route an ontological query, according to one embodiment disclosed herein.

FIG. 8 is a flow diagram illustrating a method 800 for evaluating potential query routing plans in order to efficiently route an ontological query, according to one embodiment disclosed herein. In the illustrated embodiment, the method 800 begins after the query blocks have been annotated with their potential assignments (e.g., with nodes that are capable of executing the entire block and providing all needed quantifiers). The method 800 begins at block 805, where the Query Processing Orchestrator 115 selects one of the possible combinations of node assignments. That is, in an embodiment, the Query Processing Orchestrator 115 generates all possible combinations of stores for the blocks, based on the corresponding annotations. To do so, the Query Processing Orchestrator 115 can iteratively select a different option for each block, until all possible selections have been generated.

For example, suppose a first block is annotated with "node A" and "node B," while a second block is annotated with "node A." In an embodiment, the Query Processing Orchestrator 115 will determine that the possible routing plans include assigning the first block and the second block to "node A," or assigning the first block to "node B" and the second block to "node A." At block 805, the Query Processing Orchestrator 115 selects one of the identified combinations for evaluation. The method 800 then continues to block 810.

At block 810, the Query Processing Orchestrator 115 identifies the data movement(s) that will be required under the selected plan. In embodiments, the movements are determined based on the store selections in the plan, and/or the query graph model. Continuing the above example, if the Query Processing Orchestrator 115 may determine that the plan that assigns both blocks to "node A" will require no movement, because both of the query blocks can be grouped into a single node. That is, because the blocks are consequent in the model (e.g., directly connected/separated by a single hop, with no other blocks in between) and assigned the same node, they are grouped together and no data movement is needed. In contrast, assigning the first block to "node B" will require transfer of data between "node A" and "node B" because the QGM indicates that data flows from the second block to the first block, and the blocks are assigned to different stores.

The method 800 then continues to block 815, where the Query Processing Orchestrator 115 selects one of the identified data transfers that are required by the selected query plan. At block 820, the Query Processing Orchestrator 115 determines the computational cost of the selected movement. In an embodiment, this determination is made based on a predefined cost model. In some embodiments, the model may indicate, for each ordered pair of data nodes, the computational costs of transferring data from the first to the second. The cost may include, for example, latency introduced to actually transfer the data and/or to transform the data as needed to allow the destination node to operate on it, processing time and/or memory requirements for the transfer/transformation, and the like.

At block 825, the Query Processing Orchestrator 115 determines whether the selected combination requires any additional data transfers. If so, the method 800 returns to block 815. Otherwise, the method 800 continues to block 830, where the Query Processing Orchestrator 115 computes the total cost of the selected plan by aggregating the individual costs of each movement. At block 835, the Query Processing Orchestrator 115 determines whether there is at least one alternative plan that has not been evaluated. If so, the method 800 returns to block 805. Otherwise, the method 800 proceeds to block 840, where the Query Processing Orchestrator 115 ranks the plans based on their aggregate costs. In an embodiment, the Query Processing Orchestrator 115 selects the plan that has the lowest determined cost. The Query Processing Orchestrator 115 then executes the plan by translating and routing the subqueries based on the node assignments for the minimal cost plan.

FIG. 9 is a flow diagram illustrating a method 900 for routing an ontological query, according to one embodiment disclosed herein. The method 900 begins at block 905, where a Query Processing Orchestrator 115 receives an ontological query. At block 910, the Query Processing Orchestrator 115 generates, based on the ontological query, one or more query blocks, each indicating one or more operations and one or more quantifiers representing data flow between query blocks. The method 900 then proceeds to block 915, where the Query Processing Orchestrator 115 identifies, for each of the one or more query blocks, at least one data node based on the one or more quantifiers and the one or more operations. Further, at block 920, the Query Processing Orchestrator 115 selects one or more of the identified data nodes based on predefined cost criteria.

Additionally, the Query Processing Orchestrator 115 then transmits one or more subqueries to the selected one or more data nodes at block 925.

Figure 10:
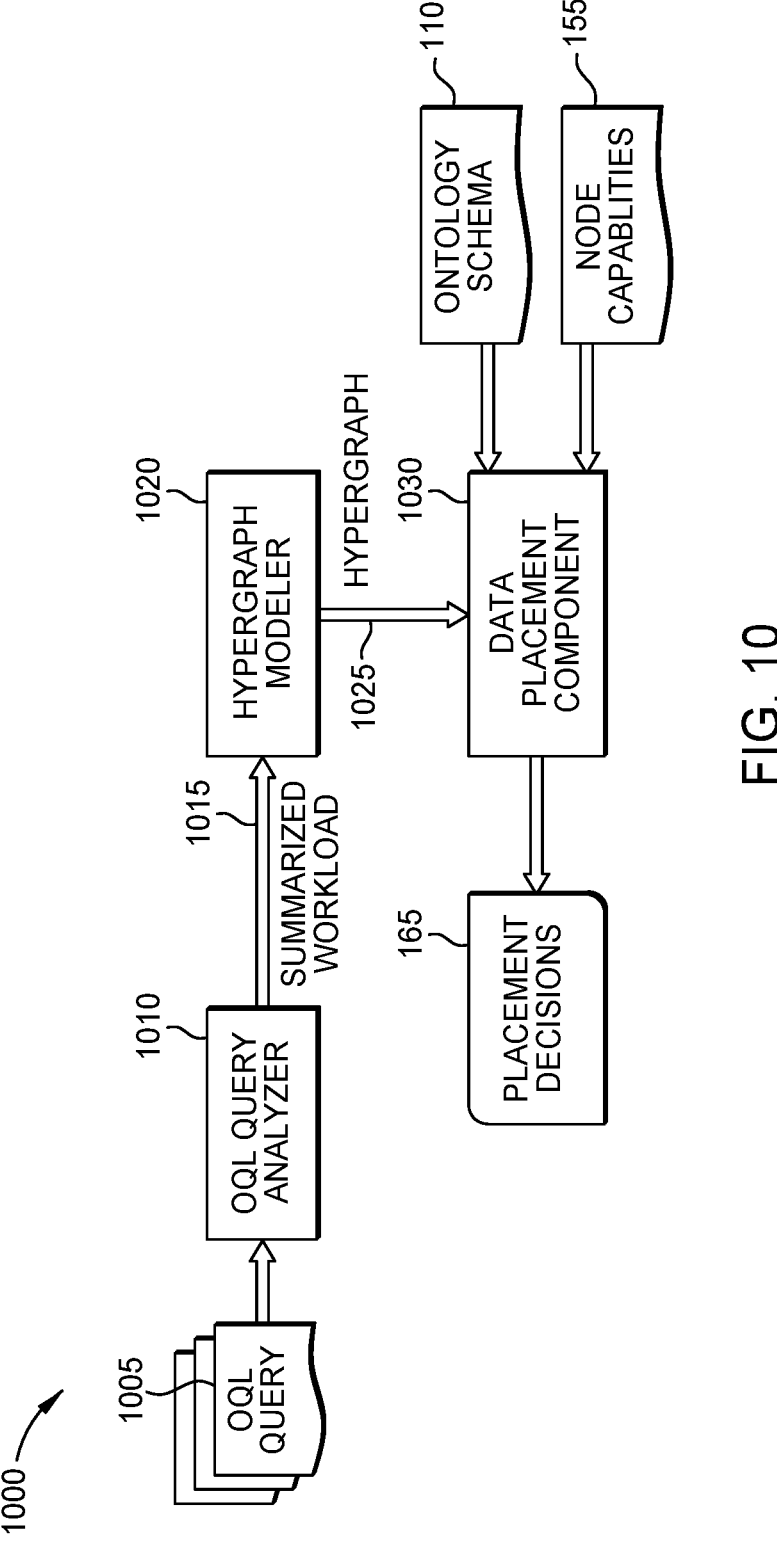
FIG. 10 illustrates a workflow for evaluating workloads and storing knowledge base data, according to one embodiment disclosed herein.

FIG. 10 illustrates a workflow 1000 for evaluating workloads and storing knowledge base data, according to one embodiment disclosed herein. As discussed above, enterprise applications often need support for different query types, depending on their query workload. To support these different query types, embodiments of the present disclosure utilize multiple backend stores, such as relational databases, document stores, graph stores, and the like. In embodiments of the present disclosure, the system has the ability to move, store, and index the knowledge base data in any backend that provides the required capability for the query types that are supported. With this flexibility to organize the data, the initial data placement across multiple backend stores can play a critical role in efficient query execution.

To achieve this efficient execution, some embodiments of the present disclosure provide an off-line data preparation and loading phase, which includes intelligent data placement. Generally, data ingestion, placement, and loading into the multiple back end stores involves a series of operations. Initially, data for the domain specific knowledge base is ingested from a variety of different sources, including structured, semi-structured and unstructured data. In some embodiments, the first phase of data ingestion from these data sources is a data enrichment/curation process which includes information extraction, entity resolution, data integration and transformation. The output data produced by this step, which conforms to the domain ontology, is then fed to the Data Placement Orchestrator 150 to generate an appropriate data placement for the multiple backend data stores. In some embodiments, the data has already been curated, and may have already been in use in responding to queries prior to the Data Placement Orchestrator 150 being used. Once a satisfactory data placement has been determined, a data load module places the instance data in appropriate data stores according to the data placement plan.

In some embodiments, data movement can be avoided during query execution by replicating the entire set of data across all the data nodes. However, this solution leads to huge replication and dramatically increases storage space overheads. Moreover, in many embodiments, not all stores provide all the necessary capabilities needed by the queries, and even full replication cannot eliminate data movement completely. To minimize unnecessary storage costs and data movement, some embodiments of the present disclosure provide capability-based data placement algorithms that assign data to data stores while taking into consideration both the expected workload and the capabilities of the backend data stores (e.g., in terms of the operations that they can perform on the stored data).

In embodiments, the Data Placement Orchestrator 150 reasons about the data placement at the level of query operations over the concepts of the domain ontology representing the schema of the data stored in the knowledge base. In some embodiments, the orchestrator identifies different and potentially overlapping subsets of the ontology based on a given workload against the knowledge base, as well as the capabilities of the underlying stores, and outputs a mapping between the identified subsets of the data and the target data stores in which the data should be stored.

In the illustrated embodiment, the workflow 1000 begins when a set of OQL Queries 1005 are received. In some embodiments, the OQL Queries 1005 are previously-submitted queries for the knowledge base. For example, in some embodiment, the knowledge base is a pre-existing corpus of data which users and applications can query and explore. In such an embodiment, the OQL Queries 1005 can correspond to queries that users, applications, and other entities previously submitted while interacting with the knowledge base.

In embodiments, the OQL Queries 1005 generally represent the average, typical, expected, and/or historical workload of the knowledge base. Stated differently, the OQL Queries 1005 are generally representative of the queries that the knowledge base receives (or is expected to receive) during runtime operations, and can be used to identify the sets of concepts that are often queried together, operations that are typically performed on each concept, and the like. As illustrated, these representative OQL Queries 1005 are provided to the OQL Query Analyzer 1010, which analyzes and evaluates them to generate a Summarized Workload 1015.

In an embodiment, the OQL Query Analyzer 1010 expresses the OQL Queries 1005 as a set of concepts and relations with the corresponding operations that are executed against them. Based on this, the analyzer generates the Summarized Workload 1015. Stated differently, the Summarized Workload 1015 reflects a summary of the provided OQL Queries 1005, which enables deeper analysis to identify patterns in the data. In one embodiment, the Summarized Workload 1015 includes a set of summarized queries generated based on the OQL Queries 1005. Notably, in some embodiments, the summarized queries are not full queries that could be executed against the knowledge base. Instead, the summarized queries indicate clusters of concepts that are likely to be queried together during runtime, along with sets of operations that are likely to be applied to each cluster of concepts.

In some embodiments, the OQL Query Analyzer 1010 takes the set of OQL Queries 1005 expressed against the domain ontology as the input, and, for each query, creates two sets. In one such embodiment, the first is a set of concepts that the query accesses, while the second is a set of operations (e.g., join, aggregation, etc.) that the query performs over those concepts. In at least one embodiment, to generate the Summarized Workload 1015 representation of the given OQL Queries 1005, the OQL Query Analyzer 1010 groups the queries that access the same set of concepts into a group, and then creates a set which combines the associated operations of each query in the group. This is discussed below in more detail.

In the illustrated embodiment, the Summarized Workload 1015 is then provided to a Hypergraph Modeler 1020, which evaluates the provided summarized queries to generate a Hypergraph 1025. In an embodiment, the Hypergraph 1025 is a graph including a set of vertices and a set of edges (also referred to as hyperedges), where each edge can connect to any number of vertices. In some embodiments, each vertex in the Hypergraph 1025 corresponds to a concept from the domain ontology, and each hyperedge corresponds to a summarized query from the Summarized Workload 1015. For example, each hyperedge spans over the set of concepts indicated by the corresponding summarized query. In one embodiment, each hyperedge is further annotated or labeled with an indication of the set of operations that are indicated by the corresponding summarized query.

As illustrated, the Hypergraph 1025 is evaluated by the Data Placement Component 1030, along with the Ontology Schema 110 and Node Capabilities 155. In one embodiment, the Data Placement Component 1030 groups the concepts and relations in the Hypergraph 1025 into potentially overlapping subsets based on the query operations. The data corresponding to these subsets can then be placed on individual backend data nodes based on their supported operations. In some embodiments, the data placement decisions are made at the granularity of the identified ontology subsets, placing all the data of any ontology concept in its entirety. In other words, the Placement Decisions 165 do not horizontally partition concepts across different stores. For example, if the Data Placement Component 1030 places the "company" concept in a first data node, all instance-level data that corresponds to the "company" concept are placed in the first data node.

In some embodiments, the ontology-based Data Placement Component 1030 follows a two-step approach for data placement. First, the Data Placement Component 1030 runs graph analysis algorithms over the Hypergraph 1025 representing the Summarized Workload 1015 in order to group the concepts in the domain Ontology Schema 110 based on the similarity of the operations that are performed on these concepts. Next, the data corresponding to these identified groups or subsets of the ontology is mapped to underlying data stores based on their respective capabilities, while minimizing the amount of replication required. In embodiments, the resulting capability based data placement minimizes data movement (and data transformation) for a given workload at query processing time, greatly enhancing the efficiency of query processing in a poly store environment. As illustrated, the final output of the Data Placement Component 1030 is a concept-to-store mapping (e.g., Placement Decisions 165) that maps the ontology concepts to the appropriate data nodes.

Although not depicted in the illustrated workflow 1000, in embodiments, the system then utilizes the Placement Decisions 165 to store the data in the various backend resources. In one embodiment, the system does so by invoking an extract, transform, and load (ETL) service that performs any transformations or conversions necessary to allow the data to be stored in the relevant Data Node(s) 130.

In some embodiments, the workflow 1000 is used to periodically re-evaluate and refine the data placement in order to maintain efficiency of the system. For example, during off-peak times (e.g., during non-business hours) the system may invoke the workflow 1000 based on an updated set of OQL Queries 1005 (e.g., including queries received after the last data placement decision) in order to determine whether the placements should be updated to reflect the evolving workload. This can improve the efficacy of the system by preventing data locations from becoming stale.

Figure 11:
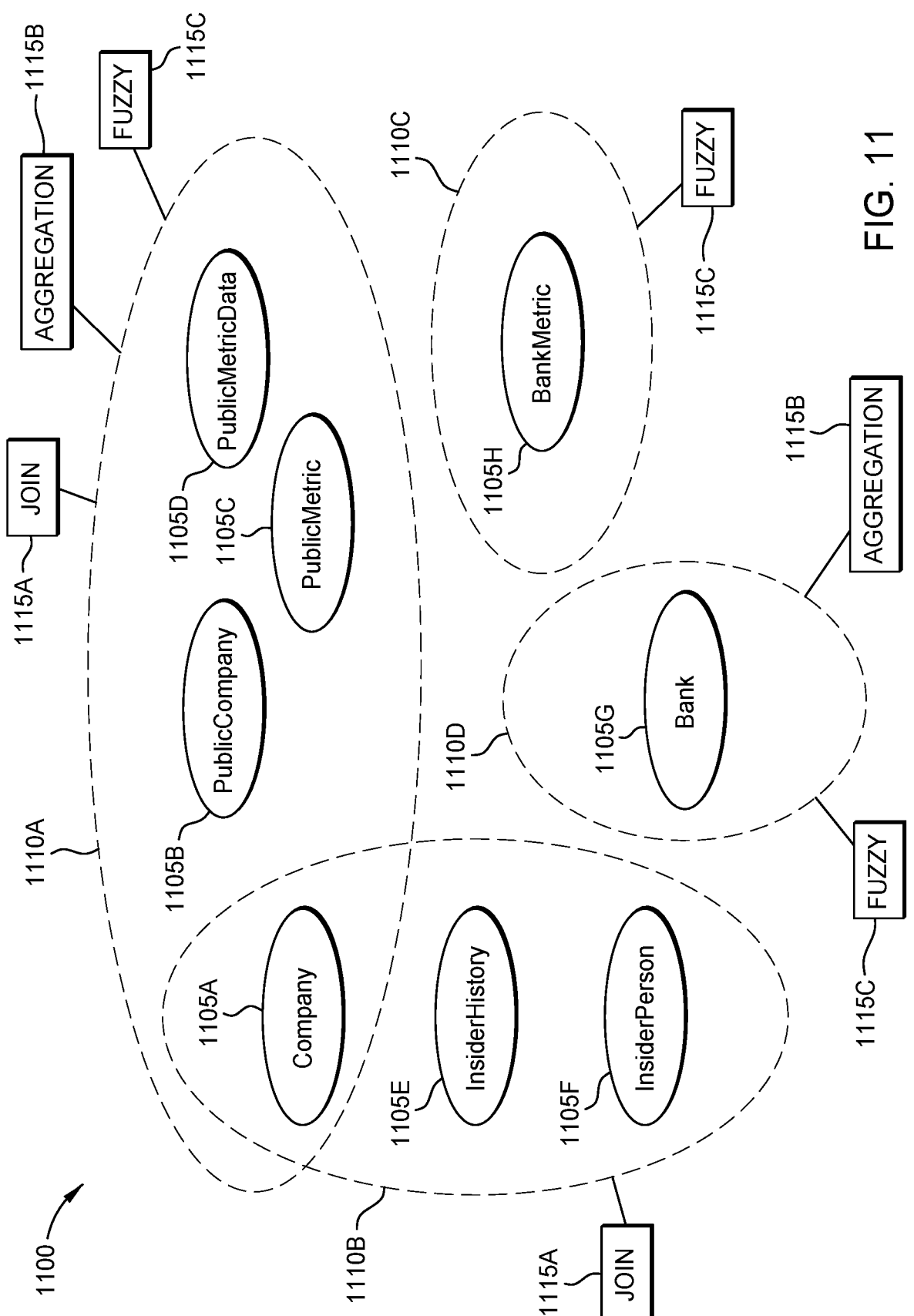
FIG. 11 depicts an example hypergraph used to evaluate workloads and store knowledge base data, according to one embodiment disclosed herein.

FIG. 11 depicts an example Hypergraph 1100 used to evaluate workloads and store knowledge base data, according to one embodiment disclosed herein. In the depicted embodiment, each Concept 1105A-G is depicted as an ellipse, and each Hyperedge 1110A-D is depicted as a dashed line encircling the Concepts 1105 to which it corresponds. For example, the Hyperedge 1110A joins Concepts 1105A ("Company"), 1105B ("PublicCompany"), 1105C ("PublicMetric"), and 1105D ("PublicMetricData"). As illustrated, each Hyerpedge 1110 can include both disjointed subsets of the Concepts 1105 (e.g., Hyperedge 1110A and 1110C do not overlap), as well as overlapping subsets (e.g., Hyperedge 1110A and 1110B overlap with respect to the "Company" Concept 1105A).

Additionally, as illustrated, each Hyperedge 1110 is labeled with the relevant Operations 1115A-C for the edge. As discussed above, in one embodiment, the labels indicate the set of operations that may be or have been applied to the Concepts 1105 connected by the Hyperedge 1110. For example, in the depicted example, the Hyerpedge 1110A is associated with Operations 1115A ("Join"), 1115B ("Aggregation"), and 1115C ("Fuzzy" matching). Notably, each Operation 1115 can be associated with any number of Hyperedges 1110 and/or Concepts 1105. In the depicted embodiment, the "Join" Operation 1115A is associated with Hyperedges 1110A and 1110B, the "Aggregation" Operation 1115B is associated with Hyperedges 1110A and 1110D, and the "Fuzzy" Operation 1115C is associated with Hyperedges 1110A, 1110D, and 1110C.

Figure 12:
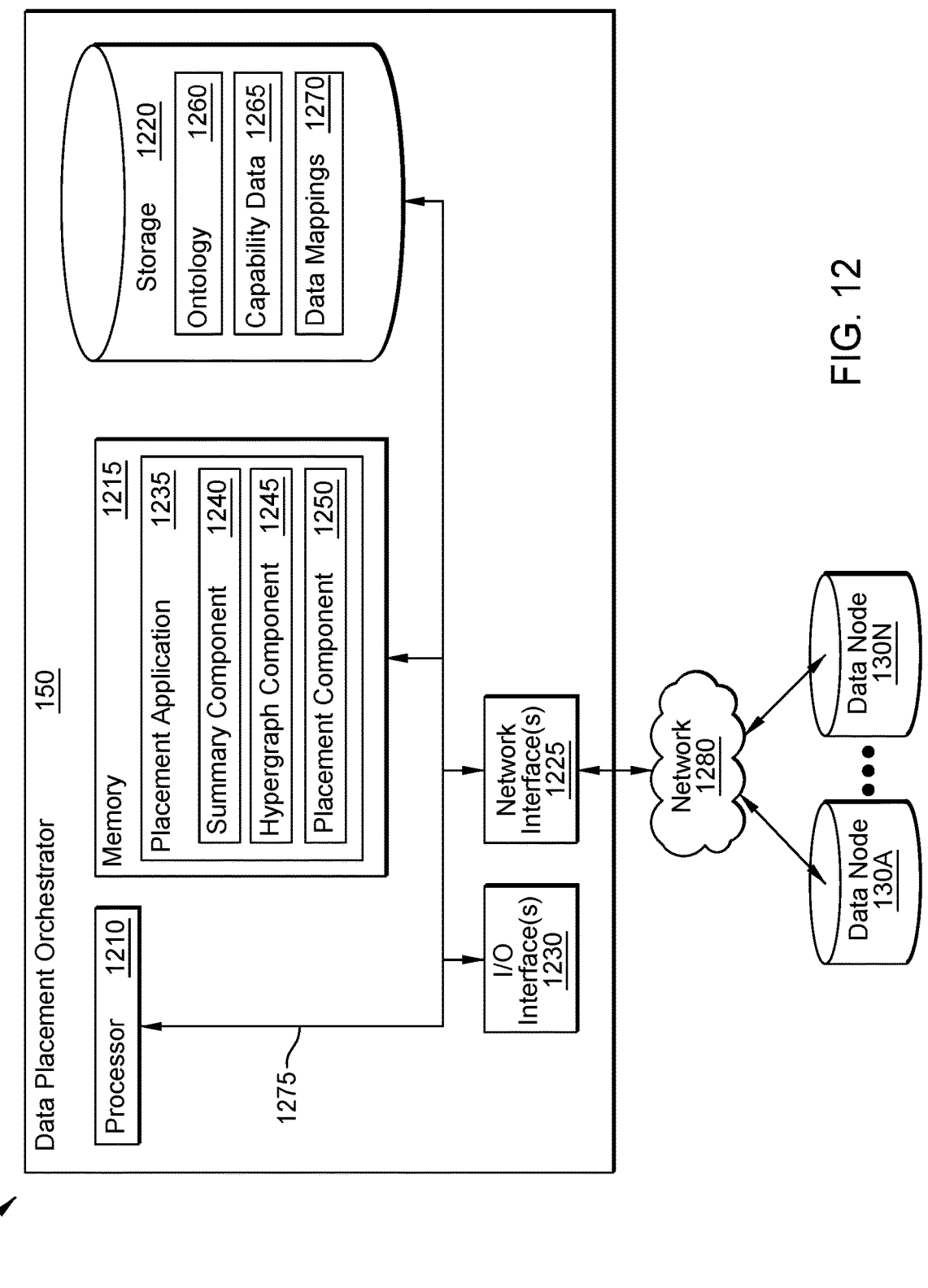
FIG. 12 is a block diagram illustrating a data placement orchestrator configured to evaluate workloads and store data, according to one embodiment disclosed herein.

FIG. 12 is a block diagram illustrating a Data Placement Orchestrator 150 configured to evaluate workloads and store data, according to one embodiment disclosed herein. Although depicted as a physical device, in embodiments, the Data Placement Orchestrator 150 may be implemented using virtual device(s), and/or across a number of devices (e.g., in a cloud environment). As illustrated, the Data Placement Orchestrator 150 includes a Processor 1210, Memory 1215, Storage 1220, a Network Interface 1225, and one or more I/O Interfaces 1230. In the illustrated embodiment, the Processor 1210 retrieves and executes programming instructions stored in Memory 1215, as well as stores and retrieves application data residing in Storage 1120. The Processor 1210 is generally representative of a single CPU and/or GPU, multiple CPUs and/or GPUs, a single CPU and/or GPU having multiple processing cores, and the like. The Memory 1215 is generally included to be representative of a random access memory. Storage 1220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 1230. Further, via the Network Interface 1225, the Data Placement Orchestrator 150 can be communicatively coupled with one or more other devices and components (e.g., via the Network 1280, which may include the Internet, local network(s), and the like). As illustrated, the Processor 1210, Memory 1215, Storage 1220, Network Interface(s) 1225, and I/O Interface(s) 1230 are communicatively coupled by one or more Buses 1275. Additionally, the Data Placement Orchestrator 150 is communicatively coupled to the Data Nodes 130A-N via the Network 1280. Of course, in embodiments, the Data Nodes 130A-N may be directly connected to the Data Placement Orchestrator 150, accessible via a local network, integrated into the Data Placement Orchestrator 150, and the like. Although not included in the illustrated embodiment, in some embodiments, the Data Placement Orchestrator 150 is further communicatively coupled with the Query Processing Orchestrator 115.

In the illustrated embodiment, the Storage 1220 includes a copy of the domain Ontology 1260, Capability Data 1265, and Data Mappings 1270. Although depicted as residing in Storage 1220, in embodiments, the Ontology 1260, Capability Data 1265, and Data Mappings 1270 may be stored in any suitable location and manner. In one embodiment, the Ontology 1260, Capability Data 1265, and Data Mappings 1270 correspond to the Ontology 560, Capability Data 565, and Data Mappings 570 discussed above with reference to the Query Processing Orchestrator 115.

For example, as discussed above, the Ontology 1260 can indicate the entities or concepts that are relevant for the domain, as well as the potential properties of each concept/entity and the relationships between and among the entities/concepts, without including instance-level data. Similarly, as discussed above, the Capability Data 1265 indicates the capabilities of each Data node 130A-N. This may include, for example, an indication as to which operation(s) each Data Node 130A-N supports, as well as any corresponding limitation(s) on that support.

In embodiments, the Data Mappings 1270 are generated by the Placement Application 1235, and indicate the Data Node(s) 130 where instance data for each entity/concept defined in the Ontology 1260 is stored. For example, the Data Mappings 1270 may indicate that all instances of a "Company" concept are stored in Data Nodes 130A and 130B, while all instances of a "Document" concept are stored in Data Nodes 130B and 130N.

In the illustrated embodiment, the Memory 1215 includes a Placement Application 1235. Although depicted as software residing in Memory 1215, in embodiments, the Placement Application 1235 may be implemented using hardware, software, or a combination of hardware and software. As illustrated, the Placement Application 1235 includes a Summary Component 1240, a Hypergraph Component 1245, and a Placement Component 1250. Although depicted as discrete components for conceptual clarity, in embodiments, the operations of the Summary Component 1240, Hypergraph Component 1245, and Placement Component 1250 can be combined or distributed across any number of components.

In an embodiment, the Summary Component 1240 receives previous OQL queries (or sample queries) that reflect the prior, current, expected, typical, average, anticipated, and/or general workload on the system. The Summary Component 1240 then evaluates the provided queries to summarize the workload in the form of summarized queries. In embodiments, the summarized queries generally indicate sets of concepts that are queried together, along with the operations performed on the concepts, but does not correspond to an actual query that could be executed. The functionality of the Summary Component 1240 is discussed in more detail below with reference to FIG. 13.

In embodiments, the Hypergraph Component 1245 receives the summarized workload information from the Summary Component 1240 and parses it to generate a hypergraph representing the query workload. As discussed above, in some embodiments, the hypergraph includes a vertex for each concept in the Ontology 1260. Additionally, in embodiments, the concept vertices are connected by hyperedges representing the summarized query workload. The operations of the Hypergraph Component 1245 are discussed in more detail below with reference to FIG. 14.

In one embodiment, the Placement Component 1250 evaluates the hypergraph in order to generate data placement decisions (e.g., Data Mappings 1270). These decisions can then be used to route data to the appropriate nodes. For example, in one embodiment, the system iterates through the knowledge base to place the data. For each data item, the system can determine the concept it corresponds to, look up the corresponding Data Node(s) 130, and store the data in the indicated node(s). In some embodiments, the system also performs any transformations or conversions that are appropriate for the destination store. The functionality of the Placement Component 1250 is discussed in more detail below with reference to FIGS. 15 and 16.

Figure 13:
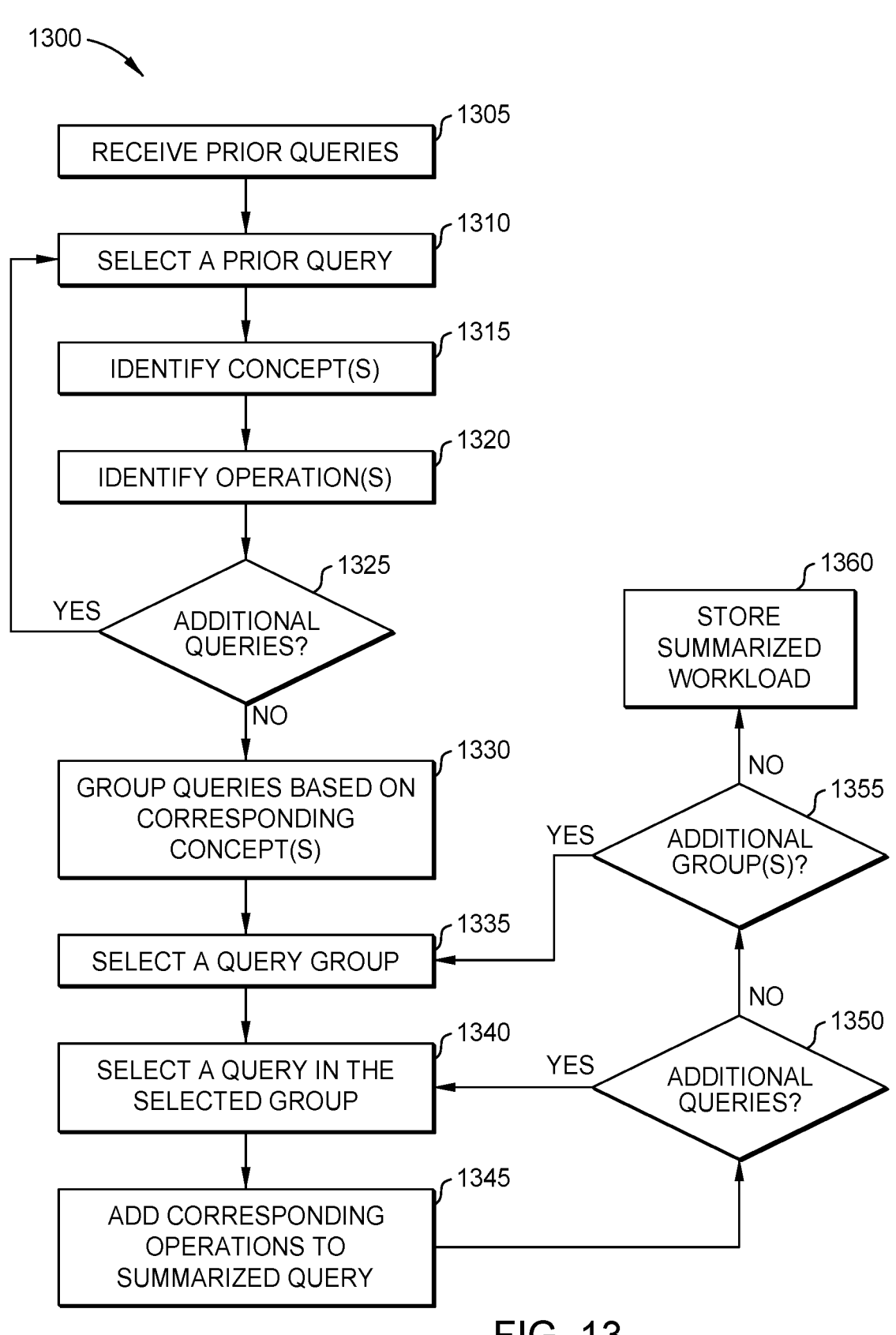
FIG. 13 is a flow diagram illustrating a method for evaluating and summarizing query workload to inform data placement decisions, according to one embodiment disclosed herein.

FIG. 13 is a flow diagram illustrating a method 1300 for evaluating and summarizing query workload to inform data placement decisions, according to one embodiment disclosed herein. The method 1300 begins at block 1305, where a Data Placement Orchestrator 150 receives one or more prior queries representative of the knowledge base workload. At block 1310, the Data Placement Orchestrator 150 selects one of the received queries for evaluation. The method 1300 then proceeds to block 1315, where the Data Placement Orchestrator 150 identifies the concept(s) that are involved by the selected query. Similarly, at block 1320, the Data Placement Orchestrator 150 identifies the operation(s) invoked by the query.

In one embodiment, the Data Placement Orchestrator 150 associates the determined set of concept(s) specified by the query with the set of operation(s) invoked by the query. In some embodiments, the operation-concept pairings are determined on a granular concept/operation-level basis. Notably, in some other embodiments, the Data Placement Orchestrator 150 does not determine which operations are linked to which concepts, but rather links the set of operations, as a whole, to the set of concepts, as a whole. That is, the Data Placement Orchestrator 150 ignores the actual execution details/desired outcome of the query, and defines the sets of relevant concepts and operations based on the data/operations involved, rather than the particular application of the transformations.

The method 1300 then proceeds to block 1325, where the Data Placement Orchestrator 150 determines whether there is at least one additional query yet to be evaluated. If so, the method 1300 returns to block 1310. Otherwise, the method 1300 proceeds to block 1330. At group 1330, the Data Placement Orchestrator 150 groups the received queries based on the corresponding set of concept(s) for each. In one embodiment, this includes grouping or clustering all queries that specify a matching set of concepts. For example, the Data Placement Orchestrator 150 can group all queries that specify a "Company" concept and a "PublicMetric" concept into a single group. Notably, in such an embodiment, queries specifying only the "Company" concept or the "PublicMetric" concept alone would be placed in differing groups. Similarly, a query that specifies "Company" and "Public-Metric," but also includes a "Document" concept would not be placed in the first group.

That is, in an embodiment, the Data Placement Orchestrator 150 groups queries that specify an exactly-matched set of concepts. Queries that specify additional concepts or fewer concepts are placed in other groups. In one embodiment, the set of concepts corresponding to each respective group are used to form a respective summarized query. That is, in the illustrated embodiment, the Data Placement Orchestrator 150 aggregates the received prior queries by grouping the queries that access identical concepts into a cluster, regardless of the operations each query performs.

The method 1300 then proceeds to block 1335, where the Data Placement Orchestrator 150 selects one of these defined query groups. At block 1340, the Data Placement Orchestrator 150 selects one of the queries associated with the selected group. Additionally, at block 1345, the Data Placement Orchestrator 150 associates the corresponding operations specified by the selected query with the summarized query representing the selected query group. In one embodiment, if an operation is already reflected in the summarized query, the Data Placement Orchestrator 150 does not add it again. That is, in an embodiment, the set of operations associated with the summarized query are binary values, indicating either the presence or absence of a given operation.

In embodiments, the operations associated with the summarized query can be any level of granularity. For example, in some embodiments, the Data Placement Orchestrator 150 defines the summarized query at the operation level (e.g., "join"), without regards to the specific type of operation (e.g., an inner join), limitations on the operation, or specifics of the operation (e.g., the type of data, such as a string join or an integer join). In other embodiments, these details are included in the summarized query description, in order to provide richer detail for subsequent processing.

The method 1300 then continues to block 1350, where the Data Placement Orchestrator 150 determines whether there is at least one additional query in the selected group. If so, the method 1300 returns to block 1340. If not, at block 1355, the Data Placement Orchestrator 150 determines whether there is at least one additional group of queries yet to be evaluated. If so, the method 1300 returns to block 1335. Otherwise, the method 1300 continues to block 1360. At block 1360, the Data Placement Orchestrator 150 stores the summarized workload such that it can be used and evaluated to generate a hypergraph.

Figure 14:
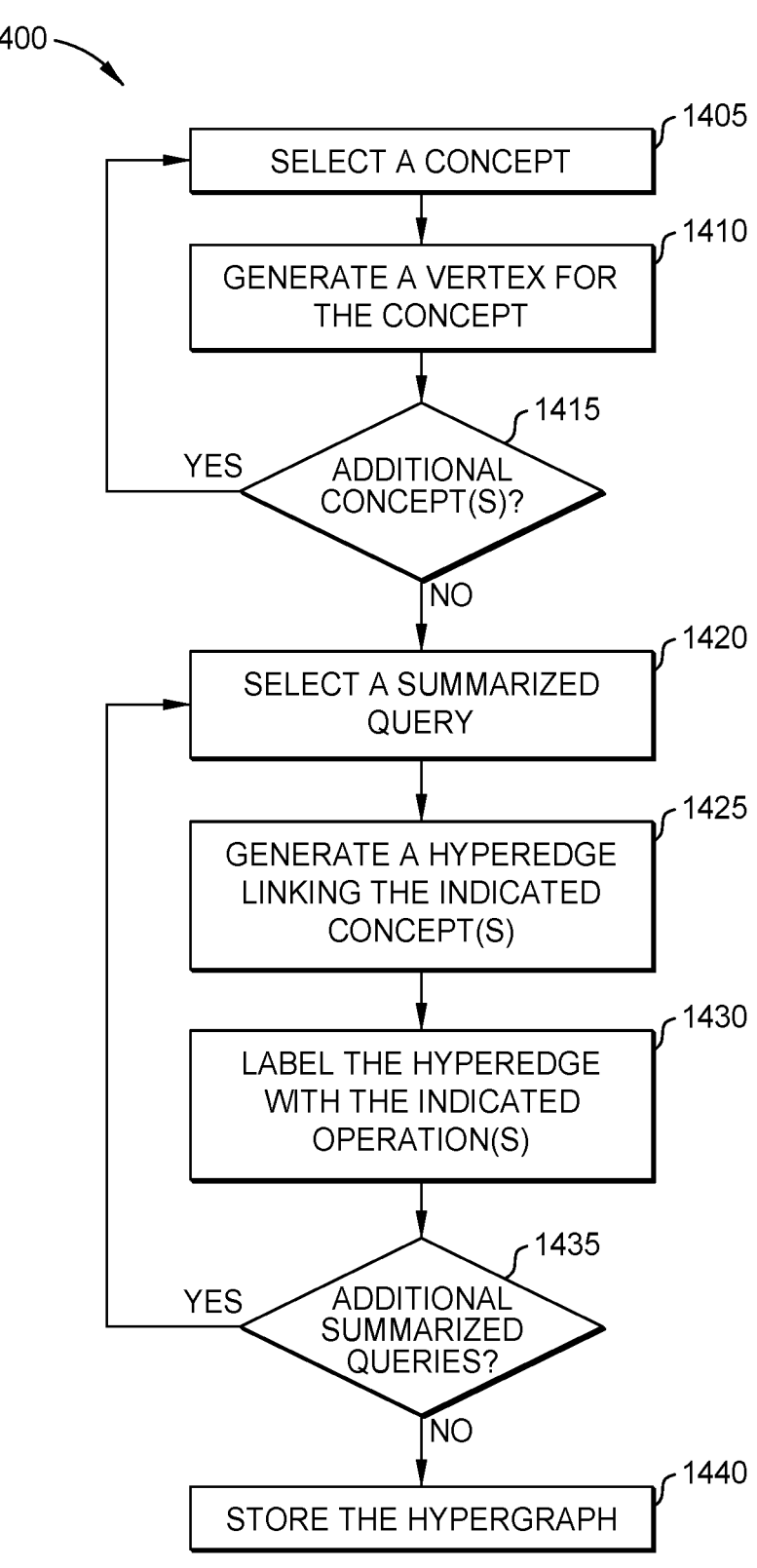
FIG. 14 is a flow diagram illustrating a method for modeling ontological workloads to inform data placement decisions, according to one embodiment disclosed herein.

FIG. 14 is a flow diagram illustrating a method 1400 for modeling ontological workloads to inform data placement decisions, according to one embodiment disclosed herein. The method 1400 begins at block 1405, where the Data Placement Orchestrator 150 selects one of the concepts of the ontology. At block 1410, the Data Placement Orchestrator 150 generates a hypergraph vertex for this selected concept. The method 1400 then continues to block 1415, where the Data Placement Orchestrator 150 determines whether there are any additional concepts remaining in the ontology which do not yet have a vertex in the hypergraph. If so, the method 1400 returns to block 1405. Otherwise, the method 1400 proceeds to block 1420.

At block 1420, the Data Placement Orchestrator 150 selects one of the summarized queries. As discussed above, in an embodiment, each summarized query indicates a set of concepts and a corresponding set of operations that have been applied to the concepts in the prior workload. At block 1425, the Data Placement Orchestrator 150 generates a hyperedge linking each of the concept(s) indicated by the selected summarized query. The method 1400 then proceeds to block 1430, where the Data Placement Orchestrator 150 labels the newly-generated hyperedge with an indication of the operations indicated by the selected summarized query. In this way, the Data Placement Orchestrator 150 can subsequently evaluate the hypergraph to identify relationships and patterns of usage for the knowledge base.

The method 1400 then continues to bock 1435, where the Data Placement Orchestrator 150 determines whether there is at least one additional summarized query to be evaluated and incorporated into the hypergraph. If so, the method 1400 returns to block 1420. Otherwise, the method 1400 continues to block 1440, where the Data Placement Orchestrator 150 stores the generated hypergraph for subsequent use.

Figure 15:
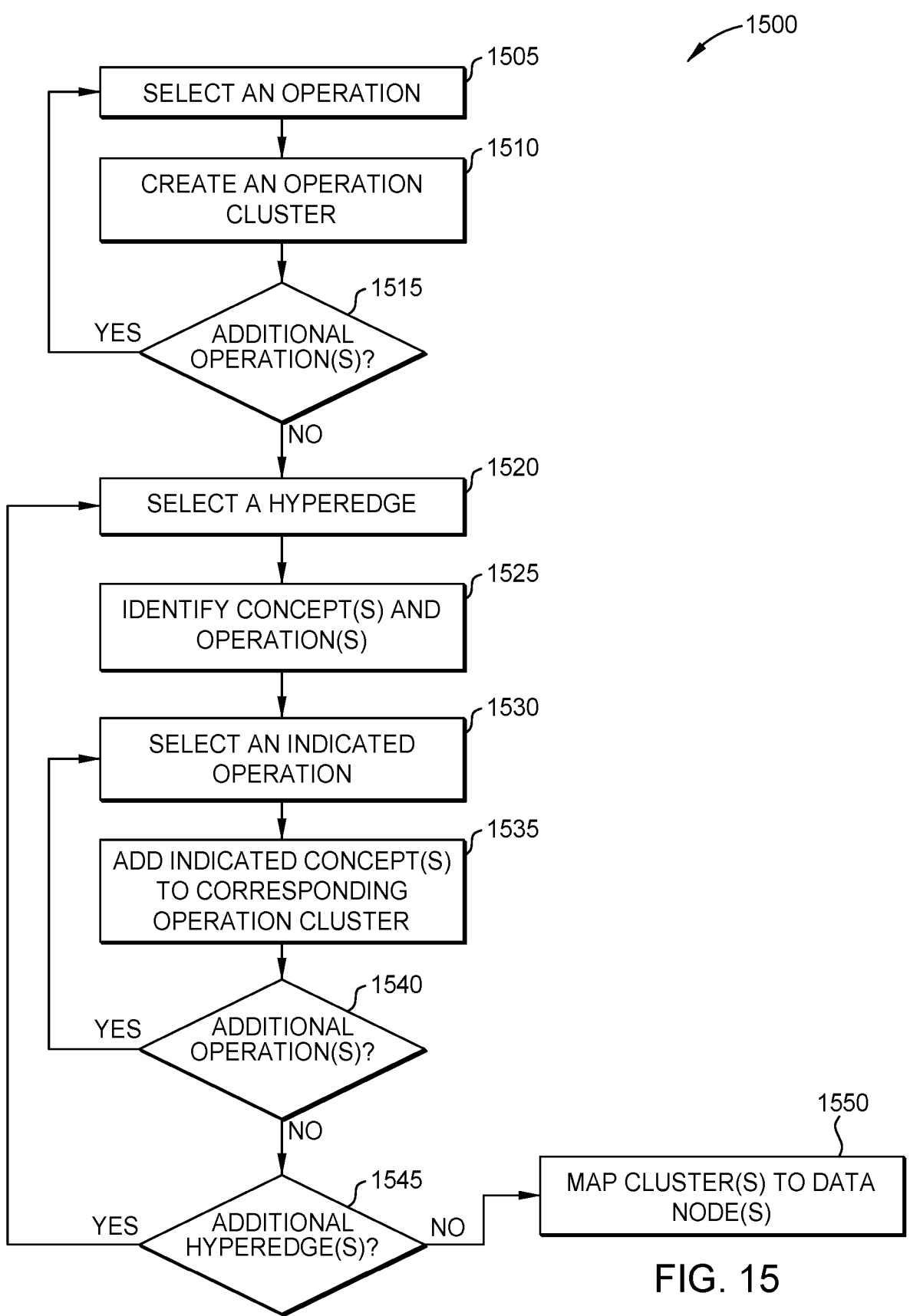
FIG. 15 is a flow diagram illustrating a method for evaluating a hypergraph to drive data placement decisions, according to one embodiment disclosed herein.
Figure 16:
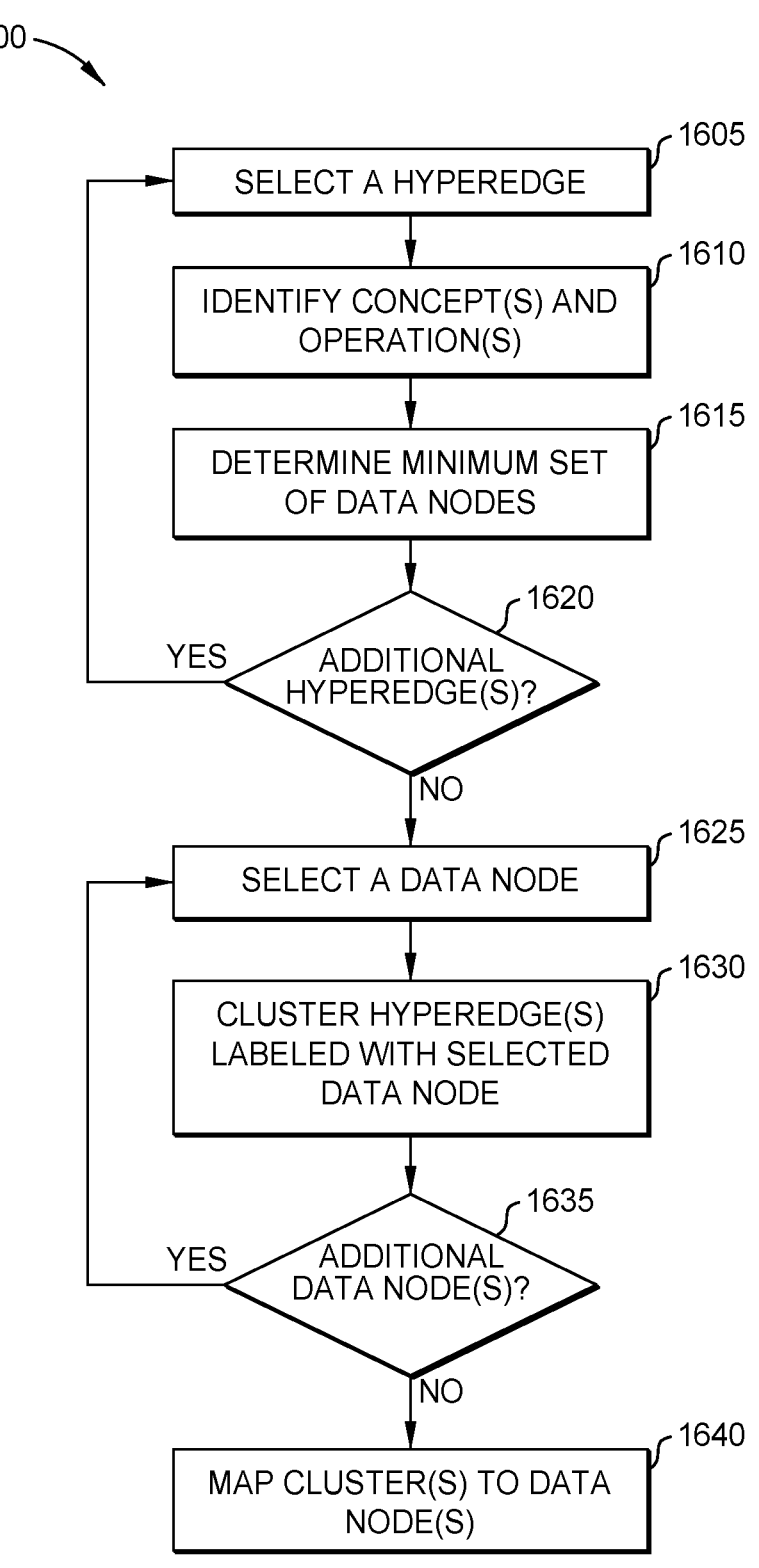
FIG. 16 is a flow diagram illustrating a method for evaluating a hypergraph to drive data placement decisions, according to one embodiment disclosed herein.

FIGS. 15 and 16 depict flow diagrams illustrating methods for evaluating a hypergraph to drive data placement decisions, according to one embodiment disclosed herein. The method 1500, discussed in reference to FIG. 15, illustrates one embodiment of an operation-based clustering technique for generating concept mappings, while the method 1600, discussed below with reference to FIG. 16, illustrates one embodiment of a minimum-cover technique.

In one embodiment, the operation-based clustering technique groups concepts based on the operations that they are subject to. In one such embodiment, for each operation description in the hypergraph, the Data Placement Orchestrator 150 creates a respective cluster. The Data Placement Orchestrator 150 then iterates over the set of operation descriptions associated with each hyperedge, and for each such operation description, assigns all the concepts spanned by the hyperedge to the cluster of the corresponding operation. In an embodiment, once the concepts have been clustered together, the Data Placement Orchestrator 150 assigns each concept cluster to a set of data nodes such that each node has a capability description that matches the operation description of the cluster (e.g., is capable of performing the corresponding operation of the cluster). Finally, in an operation-based system, the Data Placement Orchestrator 150 generates a mapping that maps each concept in each cluster to the corresponding set of identified data stores.

As an example of one embodiment of the operation-based clustering technique, consider the Hypergraph 1100 provided in FIG. 11. Initially, the Data Placement Orchestrator 150 generates a cluster C for each Operation 1115A-C (e.g., a $C_{Join}$, a $C_{Agg}$, and a $C_{Fuzzy}$). The system then determines, for each hyperedge, the set of operations associated with it. For each indicated operation, the system assigns the concepts specified by the Hyerpedge 1110 to the corresponding cluster. Continuing the above example, $C_{Join}$ will contain Concepts 1105A, 1105B, 110C, and 1105D from Hyperedge 1110A, and Concepts 1105E and 1105F from Hyperedge 1110B. Further, $C_{Agg}$ will contain Concepts 1105A, 1105B, 1105C, and 1105D from Hyperedge 1110A, as well as Concept 1105G from Hyperedge 1110D. Finally, $C_{Fuzzy}$ will contain Concepts 1105A, 1105B, 1105C, and 1105D from Hyperedge 1110A, as well as Concept 1105H from Hyperedge 1110C.

In many embodiments, these operation-based clusters have significant overlap. For example, note that the Concepts 1105A, 1105B, 1105C, and 1105D are included in every cluster. To finalize the mappings, in one embodiment, the Data Placement Orchestrator 150 identifies, for each cluster, all Data Nodes 130 capable of performing the corresponding operation. The Data Placement Orchestrator 150 then maps all Concepts 1105 in the cluster to all of the identified Data Nodes 130. In some embodiments, although the operation-based technique can minimize or reduce data movement at query processing time by placing data into all stores supporting the corresponding operations, it does introduce some replication overheads, as the same cluster of concepts can be placed at multiple stores if they have the capability to satisfy the cluster's operation.

In some embodiments, to further reduce the replication overhead, embodiments of the minimum-cover technique are utilized. In one embodiment, minimum-cover embodiments improve over the operation-based techniques by further minimizing the amount of data replication, while still minimizing the data movement at query processing time. In an embodiment, this technique leverages a minimum set-cover algorithm to find the minimum number of data stores needed to support the complete set of operations required by each hyperedge in the query workload hypergraph. In some embodiments, the minimum-cover technique minimizes the span of each hyperedge across the set of data stores that satisfy the set of operations required by the hyperedge.

In one example embodiment, the minimum-cover technique includes, for each hyperedge in the hypergraph, the Data Placement Orchestrator 150 finds the minimum number of data nodes that cover all of the indicated operations. For example, if all of the operations can be completed by a single Data Node 130A, the minimum set includes only this node. If one or more of the operations cannot be completed by the Data Node 130A, one or more other Data Nodes 130B-N are added to the minimum set until all operations are satisfied. Once the minimum set is determined for a hyperedge, each concept in the hyperedge is mapped to each of the nodes in the corresponding minimum set.

As an example of one embodiment of the minimum-cover clustering technique, consider the Hypergraph 1100 provided in FIG. 11. Suppose the Data Nodes 130 include a first Data Node 130A configured to support Operations 1115A and 1115B, a second Data Node 130B configured to support Operations 1115B and 1115C, and a third Data Node 130C supports only Operation 1115B. For the Hyperedge 1110A, the Data Placement Orchestrator 150 can determine that no node alone can support all three of the indicated operations, but that the set of Data Nodes 130A and 130B can. Because these two nodes can support the entire hyperedge, there is no need to add Data Node 130C to the set.

Similarly, Hyperedge 1110B will be assigned to Data Node 130A (the only node configured to provide join operations), while Hyperedge 1110C will be assigned to Data Node 130B (the only node configured to provide fuzzy matching). Finally, the Hyperedge 1110D can either be assigned to Data Nodes 130A and 130B, or Data Nodes 130B and 130C. In some embodiments, the Data Placement Orchestrator 150 selects between these otherwise-equivalent alternatives based on other criteria, such as the latency or compute resources of each, predefined preferences, and the like. The Data Placement Orchestrator 150 then maps the Concepts 1105 of each Hyperedge 1110 to the assigned Data Node(s) 130.

FIG. 15 is a flow diagram illustrating an operator-based method 1500 for evaluating a hypergraph to drive data placement decisions, according to one embodiment disclosed herein. The method 1500 begins at block 1505, where the Data Placement Orchestrator 150 selects one of the operations indicated by the hypergraph. At block 1510, the Data Placement Orchestrator 150 generates a cluster for the selected operation. The method 1500 then proceeds to block 1515, where the Data Placement Orchestrator 150 determines whether there is at least one additional operation reflected in the hypergraph, which does not yet have a cluster associated with it. If so, the method 1500 returns to block 1505. Otherwise, the method 1500 continues to block 1520.

At block 1520, the Data Placement Orchestrator 150 selects, for analysis, one of the hyperedges in the hypergraph. At block 1525, the Data Placement Orchestrator 150 identifies the concept(s) and operation(s) that are associated with the selected edge. The method 1500 then continues to block 1530, where the Data Placement Orchestrator 150 selects one of these indicated operations. Additionally, at block 1535, the Data Placement Orchestrator 150 identifies the corresponding cluster for the selected operation, and adds all of the concepts indicated by the selected hyperedge to this cluster. The method 1500 continues to block 1540, where the Data Placement Orchestrator 150 determines whether the selected edge indicates at least one additional operation yet-to-be processed. If so, they method 1500 returns to block 1530.

If no additional operations are associated with the selected hyperedge, the method 1500 continues to block 1545, where the Data Placement Orchestrator 150 determines whether the hypergraph includes at least one additional edge that has not yet been evaluated. If so, they method 1500 returns to block 1520. Otherwise, the method 1500 proceeds to block 1550, where the Data Placement Orchestrator 150 maps the operation cluster(s) to corresponding data node(s) configured to handle each operation. For example, in one embodiment, the Data Placement Orchestrator 150 identifies, for each cluster, the set of data nodes that are capable of performing the corresponding operation. In an embodiment, the Data Placement Orchestrator 150 then maps every concept in the cluster to the identified set of data node(s). The Data Placement Orchestrator 150 can use these mappings to distribute the data in the knowledge base across the variety of data nodes.

FIG. 16 is a flow diagram illustrating a minimum-cover based method 1600 for evaluating a hypergraph to drive data placement decisions, according to one embodiment disclosed herein. The method 1600 begins at block 1605, where the Data Placement Orchestrator 150 selects one of the hyperedges in the hypergraph. At block 1610, the Data Placement Orchestrator 150 identifies the corresponding concepts and operations associated with the selected edge. Further, at block 1615, the Data Placement Orchestrator 150 determines the minimum set of data nodes capable of collectively satisfying all of the indicated operations.

In one embodiment, the Data Placement Orchestrator 150 does so by iteratively evaluating combinations of data nodes to determine whether the combination satisfies the indicated operations. That is, whether every operation indicated by the selected edge can be performed by at least one data node in the combination. If not, the combination can be discarded (or another node can be added). Subsequently, the Data Placement Orchestrator 150 may identify the combination(s) with the minimum number of data nodes, as these combinations will likely lead to the minimum data movement during runtime. In one embodiment, if two or more combinations are equally small, the Data Placement Orchestrator 150 can utilize predefined criteria or preferences to select the best combination. For example, predefined rules may indicate that combinations including at least one relational data store are prioritized over combinations with no relational data stores. As another example, a rule may indicate weights or priorities for particular type(s) of store and/or particular Data Node(s) 130. In such an embodiment, the Data Placement Orchestrator 150 may aggregate these weights for each combination to determine which stores to use. The selected edge is then labeled with an indication of the determined set of data nodes.

Once the minimum set of data nodes has been determined, the method 1600 proceeds to block 1620, where the Data Placement Orchestrator 150 determines whether there is at least one additional hyperedge in the hypergraph. If so, the method 1600 returns to block 1605. Otherwise, the method 1600 proceeds to block 1625. At block 1625, the Data Placement Orchestrator 150 selects one of the available data nodes in the system. At block 1630, the Data Placement Orchestrator 150 identifies all hyperedges in the hypergraph having a label that includes the selected data node. The Data Placement Orchestrator 150 then groups or clusters these hyperedges (or the concepts each include) together to form a group/cluster of concepts that will be stored in the selected node. The method 1600 then proceeds to block 1635, where the Data Placement Orchestrator 150 determines whether there is at least one additional data node in the system that has not yet been assigned a group/cluster. If so, the method 1600 returns to block 1625.

Otherwise, the method 1600 proceeds to block 1640, where the Data Placement Orchestrator 150, for each data node, maps all of the concepts included in the corresponding cluster to the store. The Data Placement Orchestrator 150 can subsequently use these mappings to distribute the data in the knowledge base across the variety of data nodes.

FIG. 17 is a flow diagram illustrating a method 1700 for mapping ontological concepts to storage nodes, according to one embodiment disclosed herein. The method 1700 begins at block 1705, where a Data Placement Orchestrator 150 determines query workload information corresponding to a domain. At block 1710, the Data Placement Orchestrator 150 models the query workload information as a hypergraph, wherein the hypergraph includes a set of vertices and a set of hyperedges, wherein each vertex in the set of vertices corresponds to a concept in an ontology associated with the domain. The method 1700 then proceeds to block 1715, where the Data Placement Orchestrator 150 generates mappings between concepts and a plurality of data nodes based on the hypergraph and based further on predefined capability of each of the plurality of data nodes. Additionally, at block 1720, the Data Placement Orchestrator 150 establishes a distributed knowledge base based on the generated mappings.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Query Processing Orchestrator 115) or related data available in the cloud. For example, the Query Processing Orchestrator 115 could execute on a computing system in the cloud and evaluate queries and backend resources. In such a case, the Query Processing Orchestrator 115 could route queries and store backend resources and/or capability configurations at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:

receiving, by a query orchestrator, an ontological query;

generating, based on the ontological query, a query graph comprising an ordered set of one or more query blocks, wherein each respective query block indicates one or more operations to be applied to respective input data, and the ordered set of one or more query blocks indicates one or more quantifiers representing data flow between query blocks;

identifying, for a first query block of the query graph, at least one data node based on the one or more quantifiers and the one or more operations, comprising evaluating predefined operational capabilities of one or more data nodes, wherein the predefined operational capabilities indicate types of operations that each of the one or more data nodes supports;

selecting one or more of the identified data nodes based at least in part on predefined cost criteria indicating a cost of moving data among data nodes; and transmitting one or more subqueries to the selected one or more data nodes.

2. The method of claim 1, wherein identifying, for a first query block of the one or more query blocks, at least one data node comprises:

identifying, based on predefined capability criteria, a first set of data nodes configured to perform the one or more operations indicated by the first query block; and identifying, based on predefined concept mappings, a second set of data nodes configured to store the one or more quantifiers indicated by the first query block.

3. The method of claim 2, the method further comprising:

upon determining that a first data node belongs to both the first set and the second set of data nodes, associating the first query block with an annotation indicating the first data node.

4. The method of claim 2, the method further comprising:

upon determining that no data nodes belong to both the first set and the second set of data nodes:

identifying a first data node that belongs to the first set of data nodes;

associating the first query block with an annotation indicating the first data node; and generating one or more additional query blocks to satisfy the one or more quantifiers of the first query block.

5. The method of claim 2, the method further comprising:

upon determining that the one or more operations indicated by the first query block include a join operation between two or more quantifiers:

identifying a first data node that belongs to the first set of data nodes; and upon determining that the first data node is configured to store at least one of the two or more quantifiers, associating the first query block with an annotation indicating the first data node.

6. The method of claim 5, wherein associating the first query block with an annotation indicating the first data node is performed upon further determining that the first data node is a relational data node, wherein a second data node that is also configured to store at least one of the two or more quantifiers is excluded from the annotation based on determining that the second data node is not a relational data node.

7. The method of claim 1, wherein selecting one or more of the data nodes based on predefined cost criteria comprises:

identifying each possible combination of data nodes across each of the one or more query blocks;

generating, for each respective possible combination of data nodes, a respective movement descriptor defining a cost of transferring data between the respective combination of data nodes; and selecting a first combination of data nodes based on determining that the movement descriptor of the first combination of data nodes is lower than the movement descriptors of all other possible combinations of data nodes.

8. The method of claim 1, the method further comprising, for each respective query block of the one or more query blocks:

identifying a respective query fragment, from the ontological query, that corresponds to the respective query block;

determining a type of a data node assigned to the respective query block;

selecting a respective query translator based on the determined type of the data node assigned to the respective query block; and generating a respective subquery by processing the respective query fragment using the respective query translator.

9. A computer-readable storage medium containing computer program code that, when executed by operation of one or more computer processors, performs an operation comprising:

receiving, by a query orchestrator, an ontological query;

generating, based on the ontological query, a query graph comprising an ordered set of one or more query blocks, wherein each respective query block indicates one or more operations to be applied to respective input data, and the ordered set of one or more query blocks indicates one or more quantifiers representing data flow between query blocks;

identifying, for a first query block of the query graph, at least one data node based on the one or more quantifiers and the one or more operations, comprising evaluating predefined operational capabilities of one or more data nodes, wherein the predefined operational capabilities indicate types of operations that each of the one or more data nodes supports;

selecting one or more of the identified data nodes based at least in part on predefined cost criteria indicating a cost of moving data among data nodes; and transmitting one or more subqueries to the selected one or more data nodes.

10. The computer-readable storage medium of claim 9, wherein identifying, for a first query block of the one or more query blocks, at least one data node comprises:

identifying, based on predefined capability criteria, a first set of data nodes configured to perform the one or more operations indicated by the first query block; and identifying, based on predefined concept mappings, a second set of data nodes configured to store the one or more quantifiers indicated by the first query block.

11. The computer-readable storage medium of claim 10, the operation further comprising:

upon determining that a first data node belongs to both the first set and the second set of data nodes, associating the first query block with an annotation indicating the first data node.

12. The computer-readable storage medium of claim 10, the operation further comprising:

upon determining that no data nodes belong to both the first set and the second set of data nodes:

identifying a first data node that belongs to the first set of data nodes;

associating the first query block with an annotation indicating the first data node; and generating one or more additional query blocks to satisfy the one or more quantifiers of the first query block.

13. The computer-readable storage medium of claim 10, the operation further comprising:

upon determining that the one or more operations indicated by the first query block include a join operation between two or more quantifiers:

identifying a first data node that belongs to the first set of data nodes; and upon determining that the first data node is configured to store at least one of the two or more quantifiers, associating the first query block with an annotation indicating the first data node.

14. The computer-readable storage medium of claim 9, wherein selecting one or more of the data nodes based on predefined cost criteria comprises:

identifying each possible combination of data nodes across each of the one or more query blocks;

generating, for each respective possible combination of data nodes, a respective movement descriptor defining a cost of transferring data between the respective combination of data nodes; and selecting a first combination of data nodes based on determining that the movement descriptor of the first combination of data nodes is lower than the movement descriptors of all other possible combinations of data nodes.

15. The computer-readable storage medium of claim 9, the operation further comprising, for each respective query block of the one or more query blocks:

identifying a respective query fragment, from the ontological query, that corresponds to the respective query block;

determining a type of a data node assigned to the respective query block;

selecting a respective query translator based on the determined type of the data node assigned to the respective query block; and generating a respective subquery by processing the respective query fragment using the respective query translator.

16. A system comprising:

one or more computer processors; and a memory containing a program which when executed by the one or more computer processors performs an operation, the operation comprising:

receiving, by a query orchestrator, an ontological query;

generating, based on the ontological query, a query graph comprising an ordered set of one or more query blocks, wherein each respective query block indicates one or more operations to be applied to respective input data, and the ordered set of one or more query blocks indicates one or more quantifiers representing data flow between query blocks;

identifying, for a first query block of the query graph, at least one data node based on the one or more quantifiers and the one or more operations, comprising evaluating predefined operational capabilities of one or more data nodes, wherein the predefined operational capabilities indicate types of operations that each of the one or more data nodes supports;

selecting one or more of the identified data nodes based at least in part on predefined cost criteria indicating a cost of moving data among data nodes; and transmitting one or more subqueries to the selected one or more data nodes.

17. The system of claim 16, wherein identifying, for a first query block of the one or more query blocks, at least one data node comprises:

identifying, based on predefined capability criteria, a first set of data nodes configured to perform the one or more operations indicated by the first query block; and identifying, based on predefined concept mappings, a second set of data nodes configured to store the one or more quantifiers indicated by the first query block.

18. The system of claim 17, the operation further comprising:

upon determining that a first data node belongs to both the first set and the second set of data nodes, associating the first query block with an annotation indicating the first data node.

19. The system of claim 17, the operation further comprising:

upon determining that no data nodes belong to both the first set and the second set of data nodes:

identifying a first data node that belongs to the first set of data nodes;

associating the first query block with an annotation indicating the first data node; and generating one or more additional query blocks to satisfy the one or more quantifiers of the first query block.

20. The system of claim 17, the operation further comprising:

upon determining that the one or more operations indicated by the first query block include a join operation between two or more quantifiers:

identifying a first data node that belongs to the first set of data nodes; and upon determining that the first data node is configured to store at least one of the two or more quantifiers, associating the first query block with an annotation indicating the first data node.

* * * * *